(12) United States Patent
Campbell et al.

(10) Patent No.: US 7,617,367 B2
(45) Date of Patent: Nov. 10, 2009

(54) MEMORY SYSTEM INCLUDING A TWO-ON-ONE LINK MEMORY SUBSYSTEM INTERCONNECTION

(75) Inventors: John E. Campbell, Wappingers Falls, NY (US); Kevin C. Gower, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/426,616

(22) Filed: Jun. 27, 2006

(65) Prior Publication Data

US 2007/0300018 A1    Dec. 27, 2007

(51) Int. Cl.
G06F 12/00 (2006.01)

(52) U.S. Cl. ............... 711/149; 711/118; 711/5; 711/157; 711/173

(58) Field of Classification Search ............ 711/5, 711/173
See application file for complete search history.

(56) References Cited

U.S. PATENT DOCUMENTS

| | | | |
|---|---|---|---|
| 5,513,135 | A | 4/1996 | Dell et al. |
| 5,864,659 | A | 1/1999 | Kini |
| 6,047,346 | A * | 4/2000 | Lau et al. ............ 327/158 |
| 6,304,937 | B1 | 10/2001 | Farmwald et al. |
| 6,317,352 | B1 | 11/2001 | Halbert et al. |
| 6,378,020 | B2 | 4/2002 | Farmwald et al. |
| 6,502,131 | B1 | 12/2002 | Vaid et al. |
| 6,502,161 | B1 | 12/2002 | Perego et al. |
| 6,526,469 | B1 | 2/2003 | Drehmel et al. |
| 6,557,069 | B1 | 4/2003 | Drehmel et al. |
| 6,718,362 | B1 | 4/2004 | Beadle et al. |
| 6,859,066 | B1 * | 2/2005 | Rahman et al. ........ 326/63 |

2004/0111657 A1 * 6/2004 Choi ............ 714/724

(Continued)

FOREIGN PATENT DOCUMENTS

JP    1076335 A    3/1989

(Continued)

OTHER PUBLICATIONS

Tucker, S.G., "The IBM 3090 system: An overview", IBM Systems Journal, vol. 25, No. 1, 1986, pp. 4-19.

(Continued)

*Primary Examiner*—Brian R Peugh
*Assistant Examiner*—Victor W Wang
(74) *Attorney, Agent, or Firm*—Cantor Colburn LLP

(57) ABSTRACT

A memory system including a first memory subsystem having a buffer device with a first port and a second port, one or more memory devices coupled to the buffer device via the second port, and a first two-on-one link for coupling to a memory controller for providing communication between the buffer device and the memory controller. The first two-on-one link is coupled to the first port of the buffer device. The first memory subsystem is configured to transfer data between at least one memory device of the one or more memory devices and the memory controller via the buffer device. The first two-on-one link includes up to two transceivers connected to a single link, with at least one of the up to two transceivers consisting of any one of two or more transmitters for transmitting signals or two or more receivers for receiving signals.

21 Claims, 26 Drawing Sheets

U.S. PATENT DOCUMENTS

2004/0120630 A1 * 6/2004 Abrams et al. .............. 385/14
2004/0225830 A1 11/2004 DeLano
2005/0108187 A1 5/2005 Fujibayashi

FOREIGN PATENT DOCUMENTS

JP 3252831 A 11/1991
JP 9327080 A 12/1997

OTHER PUBLICATIONS

Curran, B.W., et al., IBM Enterprise System/9000 Type 9121 system controller and memory subsystem design, IBM J. Res. Develop., vol. 35, No. 3, May 1991, pp. 357-366.
Goettling, G, et al, "S/390 Parallel Enterprise Server Generation 3: A balanced system and cache structure", IBM J. Res. Develop. vol. 41, No. 4/5, Jul./Sep. 1997, pp. 405-428.
U.S. Appl. No. 11/426,643, filed Jun. 27, 2006.
Micron Technology, Inc., 240-Pin 4 GB DDR2 SDRAM FBDIMM, Apr. 2006, pp. 1-35.

* cited by examiner

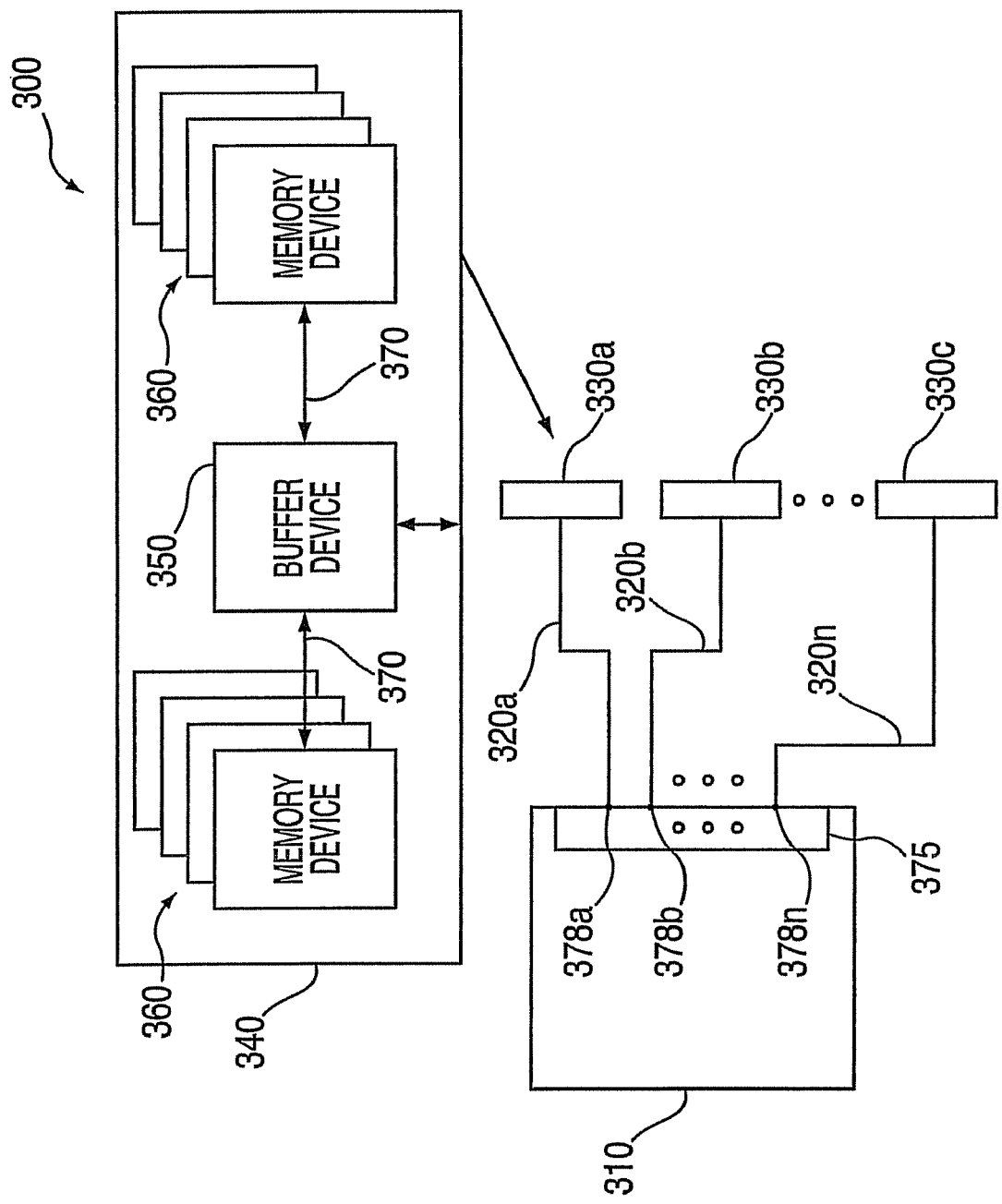

MEMORY SYSTEM INCLUDING A TWO-ON-ONE LINK MEMORY SUBSYSTEM INTERCONNECTION

BACKGROUND OF THE INVENTION

This invention relates to memory systems, memory subsystems, memory modules or a system having memory devices. More specifically, this invention is directed toward memory system architectures which may include integrated circuit devices such as one or more memory controllers and a plurality of memory devices.

Some contemporary memory system architectures may demonstrate tradeoffs between cost, performance and the ability to upgrade; for example, the total memory capacity of the system. Memory capacity is commonly upgraded via memory modules or cards featuring a connector/socket interface. Often these memory modules are connected to a bus disposed on a backplane to utilize system resources efficiently. System resources include integrated circuit die area, package pins, signal line traces, connectors, and backplane board area, just to name a few. In addition to upgradeability, many of these contemporary memory systems also require high throughput for bandwidth intensive applications, such as graphics.

With reference to FIG. 1, a representational block diagram of a conventional memory system employing memory modules is illustrated. Memory system 100 includes memory controller 110 and modules 120a-120c. Memory controller 110 is coupled to modules 120a-120c via control/address bus 130, data bus 140, and corresponding module control lines 150a-150c. Control/address bus 130 typically comprises a plurality of address lines and control signals (e.g., RAS, CAS and WE).

The address lines and control signals of control/address bus 130 are bussed and "shared" between each of modules 120a-120c to provide row/column addressing and read/write, pre-charge, refresh commands, etc., to memory devices on a selected one of modules 120a-120c. Individual module control lines 150a-150c are typically dedicated to a corresponding one of modules 120a-120c to select which of modules 1120a-120c may utilize the control/address bus 130 and data bus 140 in a memory operation.

Here and in the detailed description to follow, "bus" denotes a plurality of signal lines, each having more than two connection points for "transceiving" (i.e., transmitting or receiving). Each connection point electrically connects or couples to a transceiver (i.e., a transmitter-receiver) or one of a single transmitter or receiver circuit.

With further reference to FIG. 1, memory system 100 may provide an upgrade path through the usage of modules 120a-120c. A socket and connector interface may be employed which allows each module to be removed and replaced by a memory module that is faster or includes a higher capacity. Memory system 100 may be configured with unpopulated sockets or less than a full capacity of modules (i.e., empty sockets/connectors), and provided for increased capacity at a later time with memory expansion modules. Since providing a separate group of signals (e.g., address lines and data lines) to each module is avoided using the bussed approach, system resources in memory system 100 are efficiently utilized.

U.S. Pat. No. 5,513,135, to Dell et al., of common assignment herewith, discloses a contemporary dual inline memory module (DIMM) having one or more discrete buffer devices. In this patent, the discrete buffer devices are employed to buffer or register signals between memory devices disposed on the module and external bussing (such as control/address bus 130 in memory system 100). The discrete buffer devices buffer or register incoming control signals such as RAS, and CAS, etc., and address signals. Local control/address lines are disposed on the contemporary memory module to locally distribute the buffered or registered control and address signals to each memory device on the module. By way of note, the discrete buffer devices buffer a subset of all of the signals on the memory module since data path signals (e.g., data bus 140 in FIG. 1) of each memory device are connected directly to the external bus.

In addition to the discrete buffer device(s), a phase locked Loop (PLL) device may be disposed on the contemporary DIMM described above. The PLL device receives an external clock and generates a local phase adjusted clock for each memory device as well as the discrete buffer devices.

Modules such as the DIMM example disclosed in U.S. Pat. No. 5,513,135 feature routed connections between input/outputs (I/Os) of each memory device and connector pads disposed at the edge of the module substrate. These routed connections introduce long stub lines between the signal lines of the bus located off of the module (e.g., control address bus 130 and data bus 140), and memory device I/Os. A stub line is commonly known as a routed connection that deviates from the primary path of a signal line. Stub lines commonly introduce impedance discontinuities to the signal line. Impedance discontinuities may produce undesirable voltage reflections manifested as signal noise that may ultimately limit system operating frequency.

Examples of contemporary memory systems employing buffered modules are illustrated in FIGS. 2A and 2B. FIG. 2A illustrates a memory system 200 based on a Rambus™ channel architecture and FIG. 2B illustrates a memory system 210 based on a Synchronous Link architecture. Both of these systems feature memory modules having buffer devices 250 disposed along multiple transmit/receive connection points of bus 260. In both of these examples, the lengths of stubs are significantly shortened in an attempt to minimize signal reflections and enable higher bandwidth characteristics. Ultimately however, memory configurations such as the ones portrayed by memory systems 100, 200 and 210 may be significantly bandwidth limited by the electrical characteristics inherent in the bussed approach as described below.

In the bussed approach exemplified in FIGS. 1, 2A and 2B, the signal lines of the bussed signals become loaded with a (load) capacitance associated with each bus connection point. These load capacitances are normally attributed to components of input/output (I/O) structures disposed on an integrated circuit (IC) device, such as a memory device or buffer device. For example, bond pads, electrostatic discharge devices, input buffer transistor capacitance, and output driver transistor parasitic and interconnect capacitances relative to the IC device substrate all contribute to the memory device load capacitance.

The load capacitances connected to multiple points along the length of the signal line may degrade signaling performance. As more load capacitances are introduced along the signal line of the bus, signal settling time correspondingly increases, reducing the bandwidth of the memory system. In addition, impedance along the signal line may become harder to control or match as more load capacitances are present along the signal line. Mismatched impedance may introduce voltage reflections that cause signal detection errors. Thus, for at least these reasons, increasing the number of loads along the bus imposes a compromise to the bandwidth of the memory system.

In an upgradeable memory system, such as conventional memory system 100, different memory capacity configurations become possible. Each different memory capacity configuration may present different electrical characteristics to the control/address bus 130. For example, load capacitance along each signal line of the control/address bus 130 may change with two different module capacity configurations.

U.S. Pat. No. 6,557,069 "Processor-Memory Bus Architecture for Supporting Multiple Processors" to Drehmel et al., filed on Nov. 12, 1999 and of common assignment herewith, discloses a point-to-point data link for connecting DRAMS to a memory controller by way of a buffer device. U.S. Pat. No. 6,557,069 is incorporated herein by reference in its entirety.

U.S. Pat. No. 6,502,161 "Memory System Including a Point-to-Point Linked Memory Subsystem" to Perego et al., filed on Jan. 5, 2000 is incorporated herein by reference in its entirety and also provides a memory system architecture/interconnect topology that includes at least one point-to-point link between a master, and at least one memory subsystem. The memory subsystem includes a buffer device coupled to a plurality of memory devices. The memory system may be upgraded through dedicated point-to-point links and corresponding memory subsystems. The master communicates to the plurality of memory devices in each memory subsystem through the respective buffer device via each point-to-point link. The goal of employing a point-to-point link overcomes electrical limitations of a bused link which limits the bandwidth of transmitting data. Thus, the Perego patent portrays a memory system employing the point-to-point link.

The term "point-to-point link", as used herein and as defined by Perego, denotes one or a plurality of signal lines, each signal line having only two transceiver connection points, each transceiver connection point coupled to one transceiver, the transceiver (or transceiver circuitry) consisting of one transmitter circuit, one receiver circuit, or one transmitter and one receiver circuit. For example, a point-to-point link may include a single transmitter coupled at or near one end and a single receiver coupled at or near the other end.

U.S. Pat. No. 6,317,352 to Halbert et al., teaches a plurality of buffered memory modules connected in a daisy-chain configuration. Each buffer in the memory modules includes an input port, a memory device port and an output port, with the input and output ports being connected to each other in point-to-point connections. The input port and output port are also coupled to a bus that includes separate signal lines for memory-data signals and non memory-data signals (e.g., addresses, commands, clocks) for the data signals within the daisy-chain.

As memory systems incorporate an increasing number of memory module configurations, the verification and validation of the number of permutations that these systems male possible may become increasingly more time consuming. Verification involves the confirmation of operation, logical and/or physical functionality of an IC by running tests on models of the memory, associated devices and/or bus prior to manufacturing the device. Validation involves testing the assembled system or components thereof (e.g., a memory module). Validation typically must account for a majority of the combinations or permutations of system conditions and possibilities which different memory configurations (e.g., 256 Mbyte, 1 Gbyte . . . ) present including signaling, electrical characteristics (e.g., impedance, capacitance, and inductance variations), temperature effects, different operating frequencies, different vendor interfaces, etc, to name a few. Thus, as the number of possible memory configurations increase, the test and verification time required also increases. More time required to test a system often increases the cost of bringing the system to market or delays a product introduction beyond an acceptable window of time to achieve competitiveness.

There is a need for memory system architectures or interconnect topologies that provide cost effective upgrade capabilities without compromising bandwidth. Using conventional signaling schemes, the bussed approaches lend efficiency towards resource utilization of a system and permit module interfacing for upgradeability. However, the bussed approach may suffer from bandwidth limitations that stem from the electrical characteristics inherent in the bus topology. In addition, impedance along a signal line may be increasingly more difficult to control with increased connection points along a signal line, introducing impedance mismatch and signal reflections. Utilizing the bussed approach in implementing an upgradeable memory system introduces many possible electrical permutations and combinations with each unique module configuration.

The point-to-point link approach improves bandwidth limitations of the bus approach but limits interconnection to two transceivers per signal link with each transceiver having at most one transmitter circuit (driver circuit) and one receiver circuit.

BRIEF SUMMARY OF THE INVENTION

Exemplary embodiments include a memory system with a first memory subsystem. The first memory subsystem includes a buffer device having a first port and a second port, one or more memory devices coupled to the buffer device via the second port, and a first two-on-one link for coupling to a memory controller for providing communication between the buffer device and the memory controller. The first two-on-one link, is coupled to the first port of the buffer device. The first memory subsystem is configured to transfer data between at least one memory device of the one or more memory devices and the memory controller via the buffer device. The first two-on-one link includes up to two transceivers connected to a single link, with at least one of the up to two transceivers consisting of any one of two or more transmitters on a single chip die connected to a single chip die output pad for transmitting signals via the single chip die output pad over the single link or two or more receivers on the single chip die connected to the single chip die input pad for receiving signals via the single chip die input pad from the single link.

Further embodiments include a memory subsystem with one or more repeater devices, one or more two-on-one links and a plurality of repeater links. Each two-on-one link has a first connection for connecting to a memory controller and a second connection connected to a respective repeater device of the one or more repeater devices. Each repeater link has a first connection for connecting to a respective buffer device of a plurality of buffer devices and a second connection to the respective repeater device. The memory subsystem is configured to transfer data between at least one memory device and the memory controller via a path including a buffer device, a repeater link, the respective repeater and the two-on-one link. The two-on-one link includes up to two transceivers connected to a single link, with at least one of the up to two transceivers consisting of any one of two or more transmitters on a single chip die connected to a single chip die output pad for transmitting signals via the single chip die output pad over the single link or two or more receivers on the single chip die connected to the single chip die input pad for receiving signals via the single chip die input pad from the single link.

Further embodiments include a computer memory subsystem method with a memory controller receiving data from a buffer device at a memory subsystem port on a memory controller having a plurality of memory subsystem ports. The data is received via a two-on-one link coupled to the buffer device. The buffer device has a first port coupled to one or more memory devices and a second port coupled to the two-on-one link. The data received at the memory controller is transferred from at least one of the memory devices to the memory controller via the buffer device and the two-on-one link. The two-on-one link comprises up to two transceivers connected to a single link, where at least one of the up to two transceivers consists of any one of two or more transmitters on a single chip die connected to a single chip die output pad for transmitting signals via the single chip die output pad over the single link or two or more receivers on the single chip die connected to the single chip die input pad for receiving signals via the single chip die input pad from the single link. The method also includes transmitting data from the memory subsystem port on the memory controller to the first port on the buffer device via the two-on-one link. The at least one of the transceivers performs a function consisting of any one of receiving data by way of the two receivers or transmitting data by way of a selected one of said two transmitters.

Still further embodiments include a computer memory subsystem method. A repeater device includes a two-on-one link and a plurality of repeater links, the repeater device receiving first data from one of the repeater links and transmitting the first data to the two-on-one link. The repeater device also receives second data from the two-on-one link and transmits the second data to one of the repeater links. The two-on-one link includes up to two transceivers connected to a single link. A least one of the up to two transceivers consists of any one of two or more transmitters on a single chip die connected to a single chip die output pad for transmitting signals via the single chip die output pad over the single link or two or more receivers on the single chip die connected to the single chip die input pad for receiving signals via the single chip die input pad from the single link. The at least one of the transceivers performs a function consisting of any one of receiving data by way of the two receivers or transmitting data by way of a selected one of said two transmitters.

Still further embodiments include a service for deploying two-on-one technology. The service includes creating information for any one of making, using or selling two-on-one technology, the two-on-one technology including up to two transceivers. The two-on-one link includes up to two transceivers connected to a single link, with at least one of the up to two transceivers consisting of any one of two or more transmitters on a single chip die connected to a single chip die output pad for transmitting signals via the single chip die output pad over the single link or two or more receivers on the single chip die connected to the single chip die input pad for receiving signals via the single chip die input pad from the single link. The service also includes deploying the created information to one or more customers via a distribution process.

Still further embodiments include a memory system including a memory controller having an interface that includes a plurality of memory subsystem ports, a first memory subsystem and a plurality of two-on-one links. The first memory subsystem includes a buffer device having a first port and a second port, and a plurality of memory devices coupled to the buffer device via the second port. Data is transferred between at least one memory device of the plurality of memory devices and the memory controller via the buffer device. Each two-on-one link of the plurality of two-on-one links has a connection to a respective memory subsystem port of the plurality of memory subsystem ports. The plurality of two-on-one links include a first two-on-one link to connect the first port to a first memory subsystem port of the plurality of memory subsystem ports. Each two-on-one link includes up to two transceivers connected to a single link, where at least one of the up to two transceivers consists of any one of two or more transmitters on a single chip die connected to a single chip die output pad for transmitting signals via the single chip die output pad over the single link or two or more receivers on the single chip die connected to the single chip die input pad for receiving signals via the single chip die input pad from the single link.

Still further embodiments include a memory system including a controller device, a first buffer device having a first interface and a second interface, a second buffer device having a first interface and a second interface, a first two-on-one link, a first plurality of memory devices, a second two-on-one link, and a second plurality of memory devices. The first two-on-one link has a first connection to the controller device and a second connection to the first interface of the first buffer device. The first plurality of memory devices are connected to the second interface of the first buffer device. The second two-on-one link has a first connection to the controller device and a second connection to the first interface of the second buffer device. The second plurality of memory devices are connected to the second interface of the second buffer device, where each two-on-one link comprises up to two transceivers connected to a single link and at least one of the up to two transceivers consists of any one of two or more transmitters on a single chip die connected to a single chip die output pad for transmitting signals via the single chip die output pad over the single link or two or more receivers on the single chip die connected to the single chip die input pad for receiving signals via the single chip die input pad from the single link.

The present invention is described in the detailed description, including the embodiments to follow. The detailed description and embodiments are given by way of illustration only. The scope of the invention is defined by the attached claims. Various modifications to the embodiments of the present invention remain within the scope defined by the attached claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 3A and 3B illustrate a block diagram representing memory systems according to embodiments of the present invention;

DETAILED DESCRIPTION OF EXEMPLARY EMBODIMENTS

Figure 1:
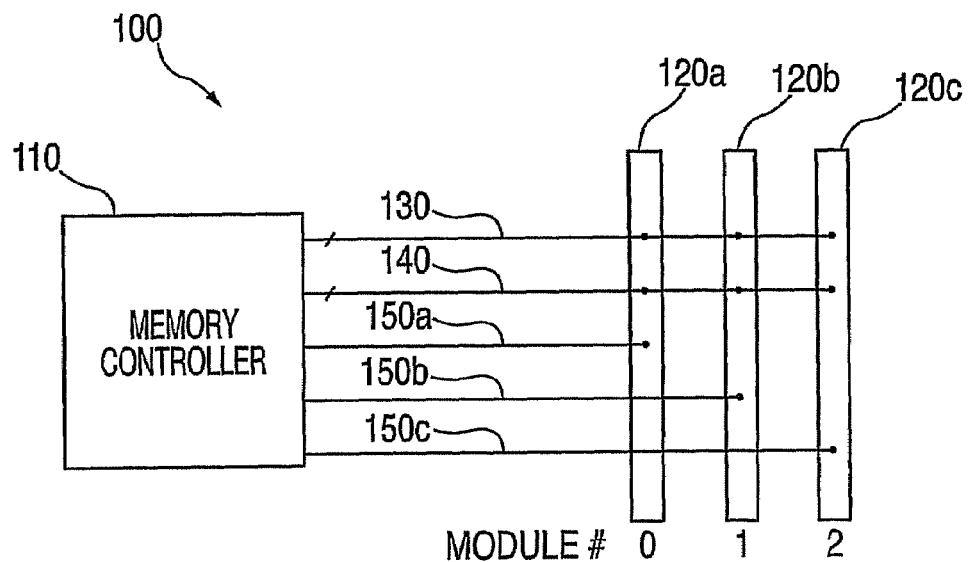
FIG. 1 illustrates a representational block diagram of a conventional memory system employing memory modules of the Prior Art.

Exemplary embodiments provide a two-on-one link, where a transceiver connected to the link has redundant transmitters and/or redundant receivers which are employed for reliability advantages. In such an embodiment, a transceiver has a live transmitter and/or receiver as well as a spare transmitter and/or receiver such that a failing transmitter or receiver can be dynamically replaced by it's corresponding spare. A two-on-one link is characterized as one or more two-on-one signal links, each two-on-one signal link consisting of a first transceiver on a first chip interconnected to a second transceiver on a second chip, the first transceiver including two or more transmitters and/or two or more receivers Other exemplary embodiments provide a two-on-one link signal line, where a transceiver connected to the signal line has a plurality of receivers and more than one of the receivers are used to receive data destined for logic connected to the transceiver. In one such embodiment, each receiver receives a different phase of signals from the signal line.

Other exemplary embodiments are directed toward memory system architectures (i.e., interconnect topologies) which include a controller communicating to at least one memory subsystem (e.g., a buffered memory module). An independent two-on-one link may be utilized between the controller and each memory subsystem to eliminate physical inter-dependence between memory subsystems. According to exemplary embodiments, the memory system may be upgraded by coupling additional memory module(s), each via a dedicated two-on-one link to the controller. Bandwidth may scale upwards as the memory system is upgraded by the additional memory module(s).

Exemplary embodiments relate to a memory system which includes a plurality of two-on-one links connected to a master. At least one two-on-one link connects at least one memory subsystem to the master, (e.g., a processor or controller). The memory system may be upgraded by coupling memory subsystems to the master via respective dedicated two-on-one links. Each memory subsystem includes a buffer device that communicates to a plurality of memory devices. The master communicates with each buffer device via each two-on-one link. The buffer device may be disposed on a memory module along with the plurality of memory devices and connected to the two-on-one link via a connector. Alternatively, the buffer device may be disposed on a common printed circuit board or backplane link along with the corresponding two-on-one link and master.

"Memory devices" are a common class of integrated circuit devices that have an array of memory cells, such as, dynamic random access memory (DRAM), static random access memory (SRAM), etc. A "memory subsystem" is a plurality of memory devices interconnected with an integrated circuit device (e.g., a buffer device) providing access between the memory devices and an overall system, for example, a computer system. It should be noted that a memory system is distinct from a memory subsystem in that a memory system may include one or more memory subsystems. A "memory module" or simply just "module" denotes a substrate having a plurality of memory devices employed with a connector interface. It follows from these definitions that a memory module having a buffer device isolating at least data, and preferably isolating control, and address signals of the memory devices from the connector interface is a memory subsystem. Unless otherwise specified, as used herein the term data refers to data stored/retrieved from data devices as well as the control and address signals.

Figure 3B:
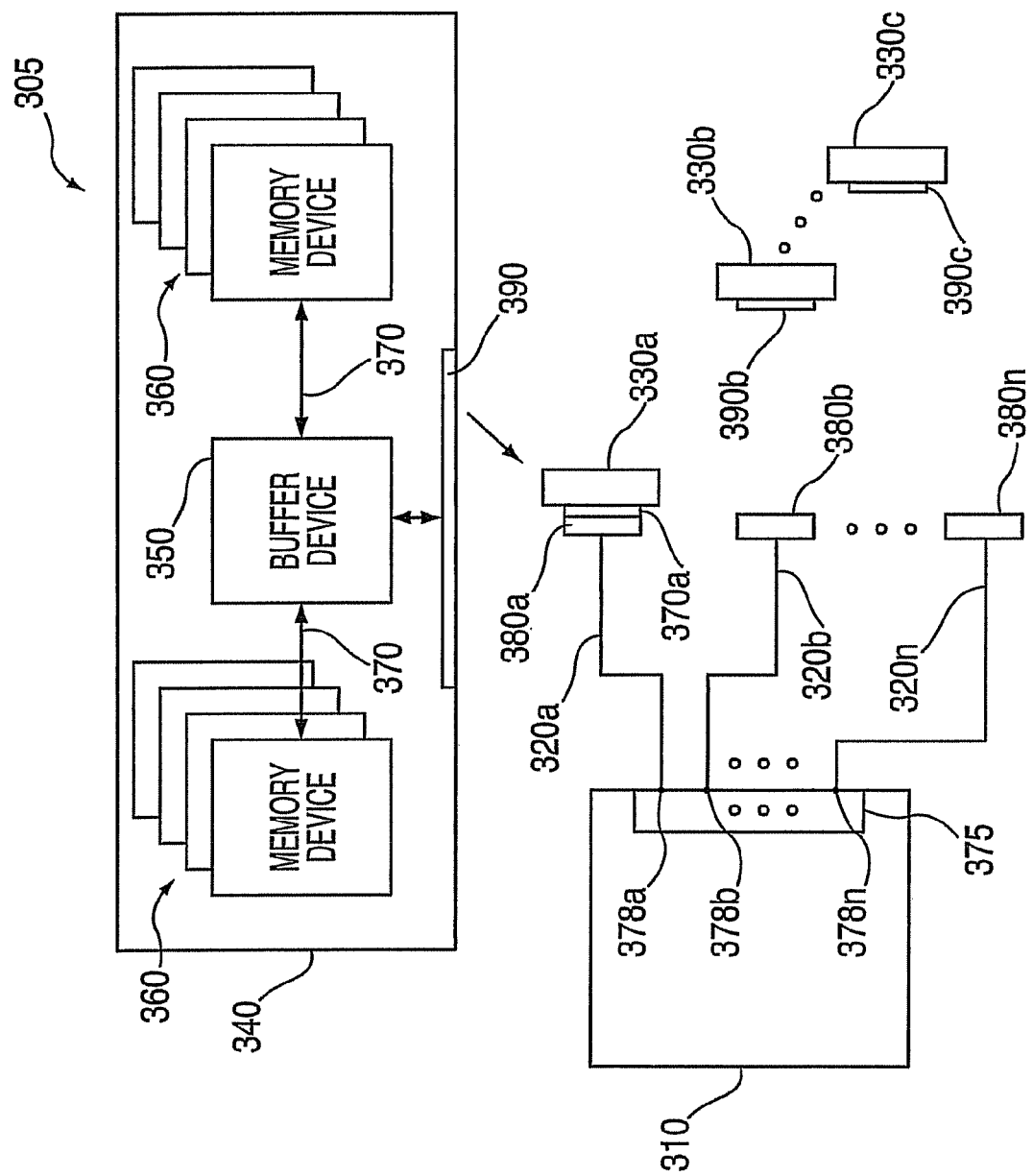

With reference to FIGS. 3A and 3B, block diagrams of a memory system according to embodiments of the present invention are illustrated. Memory systems 300 and 305 include a controller 310, a plurality of two-on-one links 320a-320n, and a plurality of memory subsystems 330a-330n. For simplicity, a more detailed embodiment of memory subsystem 330a is illustrated as memory subsystem 340. Buffer device 350 and a plurality of memory devices 360 are disposed on memory subsystem 340. Buffer device 350 is coupled to the plurality of memory devices 360 via channels 370. Interface 375 disposed on controller 310 includes a plurality of memory subsystem ports 378a-378n. A "port" is a portion of an interface that serves a congruent I/O functionality. One of memory subsystem ports 378a-378n includes I/Os, for sending and receiving data, addressing and control information over one of two-on-one links 320a-320n.

According to exemplary embodiments, at least one memory subsystem is connected to one memory subsystem port via one two-on-one link. The memory subsystem port is disposed on the memory controller interface which includes a plurality of memory subsystem ports, each having a connection to a two-on-one link.

In FIG. 3A, two-on-one links 320a-320n, memory subsystems 330a-330c, and controller 310, are incorporated on a common substrate (not shown) such as a wafer or a printed circuit board (PCB) in memory system 300. In alternate embodiments, memory subsystems are incorporated onto individual substrates (e.g., PCBs) that are incorporated fixedly attached to a single substrate that incorporates two-on-one links 320a-320n and controller 310. In other alternate embodiments, as illustrated in FIG. 3B, memory subsystems 330a-330c are incorporated onto individual substrates which include connectors 390a-390c to support upgradeability in memory system 305. Corresponding mating connectors 380a-380n are connected to a connection point of each two-on-one link 320a-320n. Each of mating connectors 380a-380n interface with connectors 390a-390c to allow removal/inclusion of memory subsystems 330a-330c in memory system 305. In exemplary embodiments, mating connectors 380a-380n are sockets and connectors 390a-390c are edge connectors disposed on an edge of each substrate 330a-330c. Mating connectors 380a-380n, are attached to a common substrate shared with two-on-one connections 320a-320n and controller 310.

In exemplary embodiments, two-on-one links are employed in interconnecting channels 370 between a buffer device 350 and memory devices 360.

With further reference to FIGS. 3A and 3B, buffer device 350 transceives and provides isolation between signals interfacing to controller 310 and signals interfacing to the plurality of memory devices 360. In a normal memory read operation, buffer device 350 receives control, and address information from controller 310 via two-on-one link 320a and in response, transmits corresponding signals to one or more, or all of memory devices 360 via channel 370. One or more of memory devices 360 may respond by transmitting data to buffer device 350 which receives the data via one or more of channels 370 and in response, transmits corresponding signals to controller 310 via two-on-one link 320a. Controller 310 receives the signals corresponding to the data at corresponding port 378a-378n. In this exemplary embodiment, memory subsystems 330a-330n are buffered modules. By way of comparison, buffers disposed on the conventional DIMM module in U.S. Pat. No. 5,513,135 to Dell et al., of common assignment herewith, are employed to buffer or register control signals such as RAS, and CAS, etc., and address signals. Data I/Os of the memory devices disposed on the DIMM are connected directly to the DIMM connector (and ultimately to data lines on an external bus when the DIMM is employed in memory system 100).

Buffer device 350 provides a high degree of system flexibility. New generations of memory devices may be phased in with controller 310 or into memory system 300 by modifying buffer device 350. Backward compatibility with existing generations of memory devices (i.e., memory devices 360) may also be preserved. Similarly, new generations of controllers may be phased in which exploit features of new generations of memory devices while retaining backward compatibility with existing generations of memory devices.

Buffer device 350 effectively reduces the number of loading permutations on the corresponding two-on-one link to one, thus simplifying test procedures. For example, characterization of a two-on-one link may involve aspects such as multiple transmitters and/or multiple receivers at one end, few to no impedance discontinuities, and relatively short interconnects. By way of contrast, characterization of control/address bus 130 (see FIG. 1) may involve aspects such as multiple transmit and receive points, long stub lines, and multiple load configurations, to name a few. Thus, the increased number of electrical permutations tend to add more complexity to the design, test, verification and validation of memory system 100. Point-to-point links are limited to one transmitter and one receiver at each end of a point-to-point link.

Buffered modules added to upgrade memory system 300 (e.g., increase memory capacity) are accommodated by independent two-on-one links. Relative to a bussed approach, system level design, verification and validation considerations are reduced, due to the decreased amount of module inter-dependence provided by the independent two-on-one links. Additionally, the implementation, verification and validation of buffered modules may be performed with less reliance on system level environment factors.

Several embodiments of two-on-one links 320a-320n include a plurality of link architectures, signaling options, clocking options and interconnect types. Embodiments having different link architectures include simultaneous bi-directional links, time multiplexed bi-directional links and multiple unidirectional links. Voltage or current mode signaling may be employed in any of these link architectures. Clocking methods include any of globally synchronous clocking; source synchronous clocking (i.e., where data is transported alongside the clock) and encoding the data and the clock together. In exemplary embodiments, differential signaling is employed and is transported over differential pair lines. In alternate embodiments, one or more common voltage or current references are employed with respective one or more current/voltage mode level signaling. In yet other embodiments, multi-level signaling—where information is transferred using symbols formed from multiple signal (i.e., voltage/current) levels is employed.

Signaling over two-on-one links 320a-320n may incorporate different modulation methods such as non-return to zero (NRZ), multi-level pulse amplitude modulation (PAM), phase shift keying, delay or time modulation, quadrature amplitude modulation (QAM) and Trellis coding. Other signaling methods and apparatus may be employed in two-on-one links 320a-320n, for example, optical fiber based apparatus and methods.

The term "point-to-point link" denotes one or a plurality of signal lines, each signal line having only two transceiver connection points, each transceiver connection point coupled to transmitter circuitry, receiver circuitry or transceiver circuitry. For example, a point-to-point link may include a transmitter coupled at or near one end and a receiver coupled at or near the other end. The point-to-point link may be synonymous and interchangeable with a point-to-point connection or a point-to-point coupling.

In keeping with the above description, the number of transceiver points along a signal line distinguishes between a point-to-point link and a bus. According to the above, the point-to-point link consists of two transceiver connection points while a bus consists of more than two transceiver points.

The term "two-on-one link" denotes one or a plurality of signal lines, each signal line having no more than two transceiver connection points, each transceiver connection point coupled to a transceiver, the transceiver comprising transmitter circuitry and/or receiver circuitry with at least one transceiver having two or more transmitters and/or two or more receivers. For example, a transceiver in a two-on-one link may include two transmitters coupled at or near one end and a receiver coupled at or near the other end. Another two-on-one link transceiver may include one transmitter coupled at or near one end and two receivers coupled at or near the other end. The two-on-one link may be synonymous and interchangeable with a two-on-one connection or a two-on-one coupling.

In keeping with the above description, the number of transceiver points along a signal line distinguishes between a two-on-one link and a bus. According to the above, the two-on-one link consists of two transceiver connection points, one at each end of the link (e.g., modules and/or controllers) while a bus consists of capability for connecting more than two interconnected modules, while a point-to-point link consists of two interconnected transceivers, the point-to-point transceivers are limited to one transmitter circuit and/or one receiver circuit. In contrast, the two-on-one link includes two interconnected transceivers, where at least one of the transceivers has two or more receivers and/or two or more transmitters.

One or more terminators (e.g., a resistive element) may terminate each signal line in two-on-one links $320a$-$320n$. In exemplary embodiments, the terminators are connected to the two-on-one link and situated on buffer device $350$, on a memory module substrate and optionally on controller $310$ at memory subsystem ports $378a$-$378n$. The terminator(s) connect to a termination voltage, such as ground or a reference voltage. The terminator may be matched to the impedance of each transmission line in two-on-one links $320a$-$320n$, to help reduce voltage reflections.

In exemplary embodiments employing multi-level PAM signaling, the data rate may be increased without increasing either the system clock frequency or the number of signal lines by employing multiple voltage levels to encode unique sets of consecutive digital values or symbols. That is, each unique combination of consecutive digital symbols may be assigned to a unique voltage level, or pattern of voltage levels. For example, a 4-level PAM scheme may employ four distinct voltage ranges to distinguish between a pair of consecutive digital values or symbols such as 00, 01, 10 and 11. Here, each voltage range would correspond to one of the unique pairs of consecutive symbols.

Figure 4A:
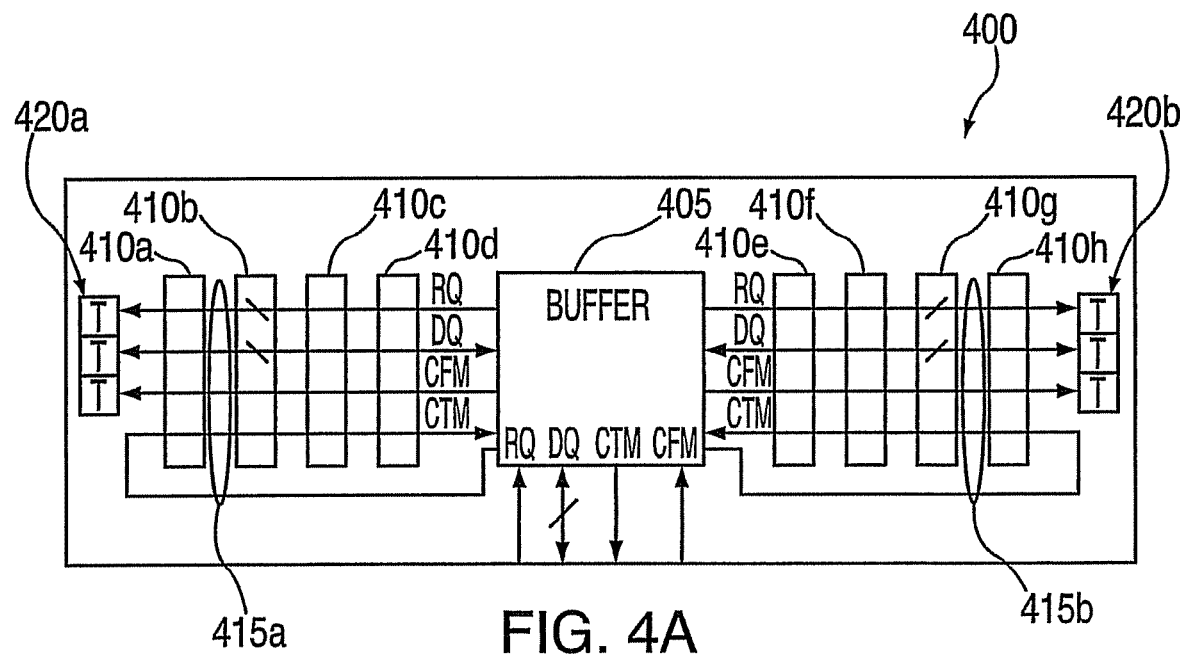
FIGS. 4A, 4B, and 4C illustrate buffered memory modules according to embodiments of the present invention.
Figure 4B:
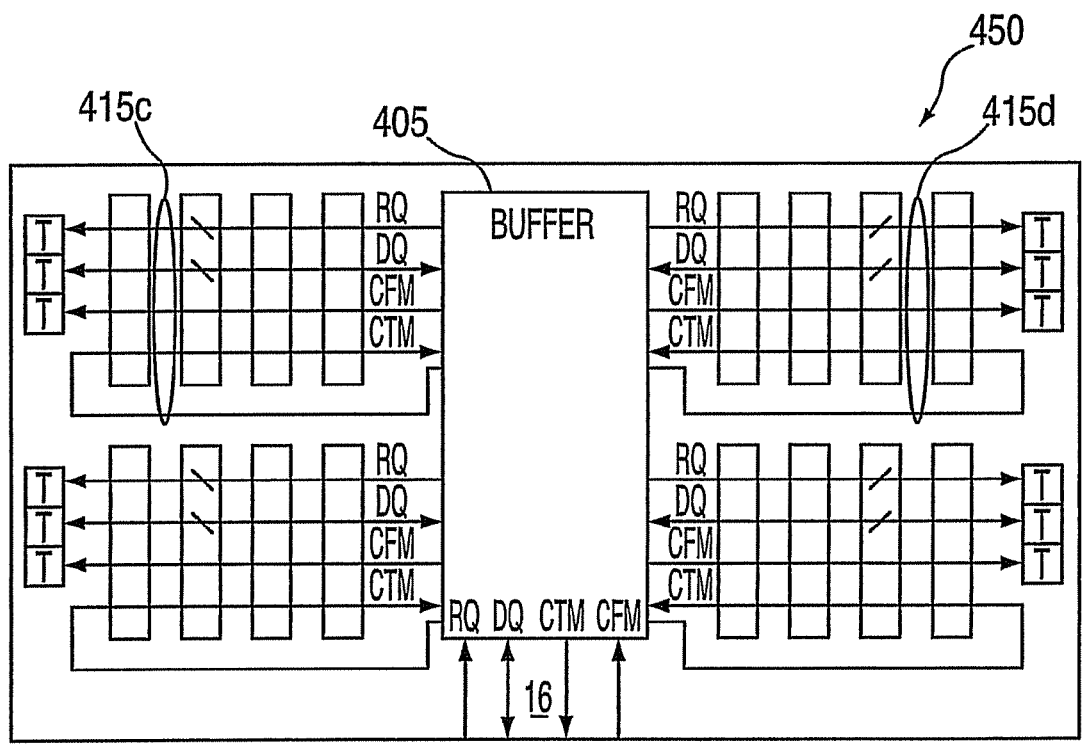
Figure 4C:
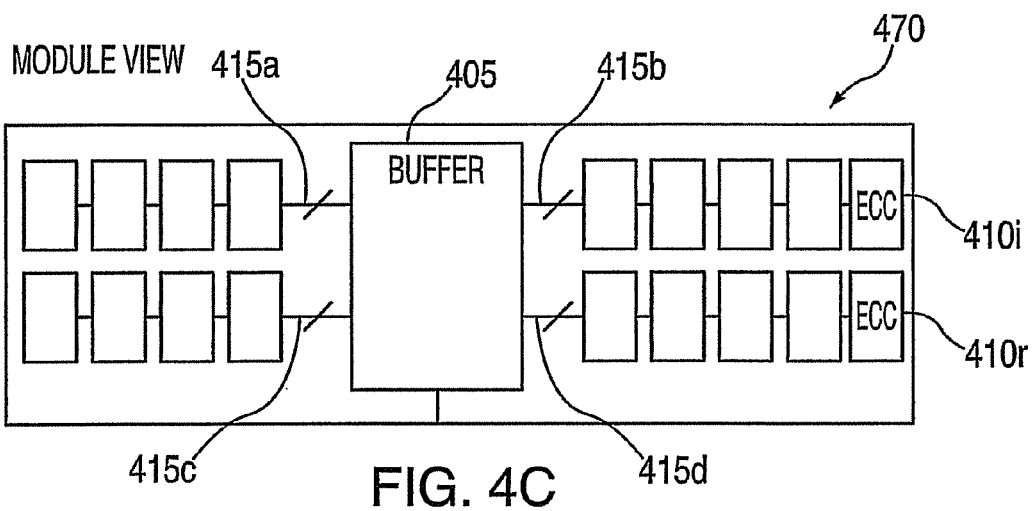

With reference to FIGS. 4A, 4B and 4C, buffered memory modules according to exemplary embodiments are shown. Modules $400$ and $405$ include buffer device $405$ and a plurality of memory devices $410a$-$410h$ communicating over a pair of channels $415a$ and $415b$. In these embodiments channel $415a$ communicates to memory devices $410a$-$410d$ and channel $415b$ communicates to memory devices $410e$-$410h$.

Figure 2A:
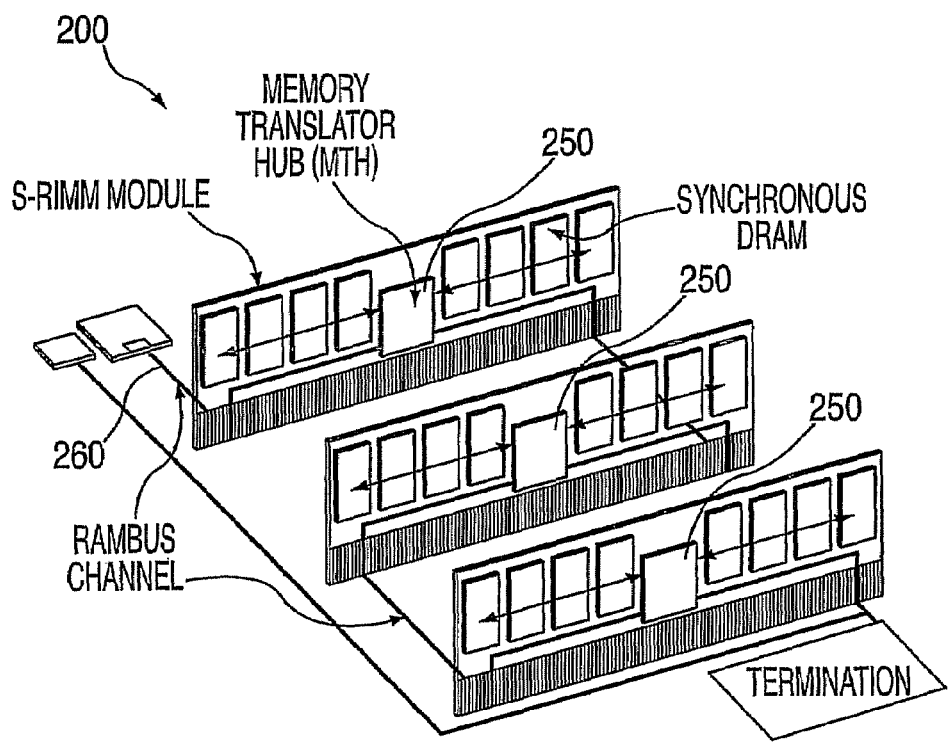
FIGS. 2A and 2B illustrate contemporary memory systems employing buffered modules of the Prior Art.
Figure 2B:
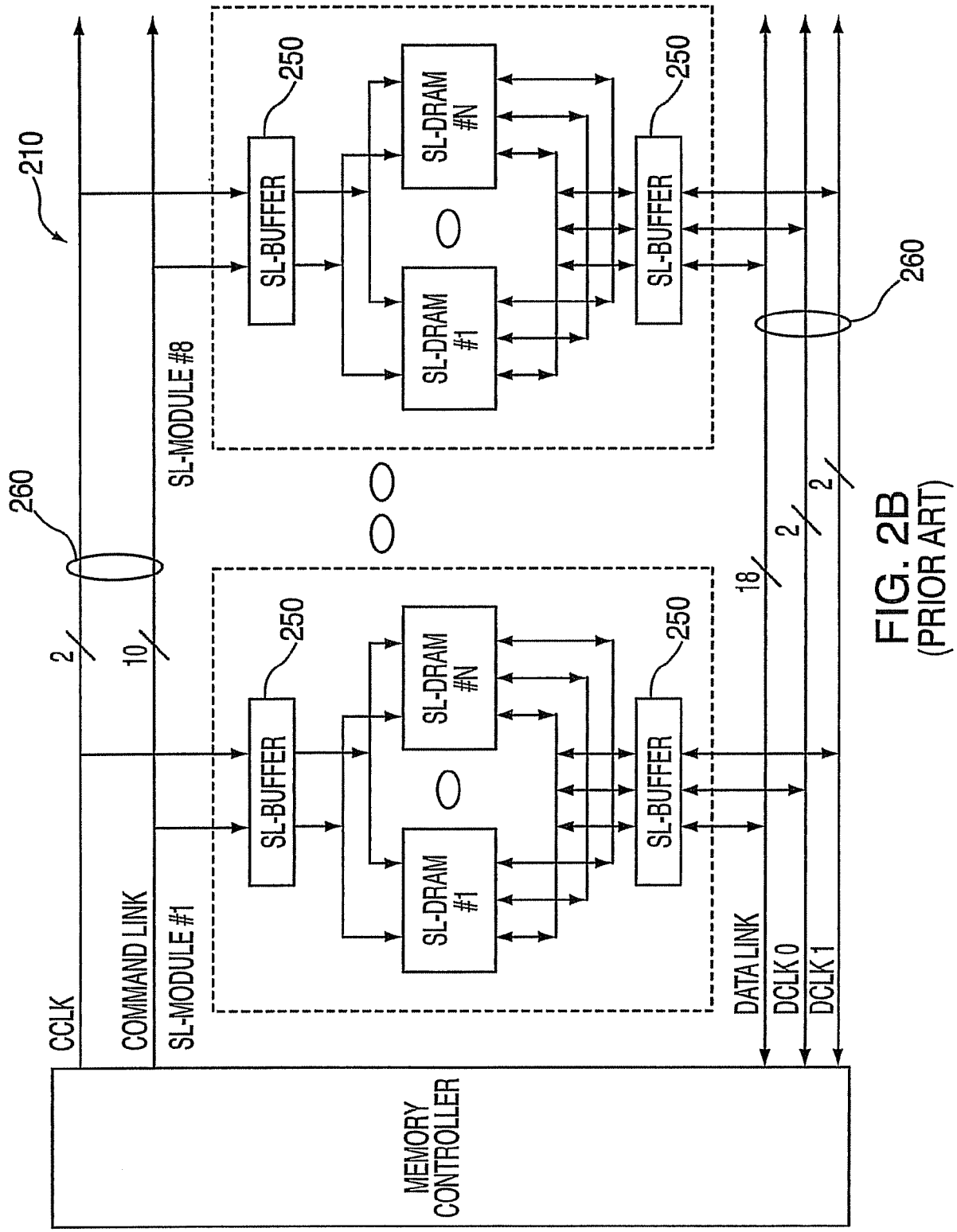

In exemplary embodiments, channels $415a$ and $415b$ consist of a plurality of signal lines in a relatively short multi-drop bus implementation. The plurality of signal lines may be controlled impedance transmission lines that are terminated using respective termination elements $420a$ and $420b$. Channels $415a$ and $415b$ are relatively short (i.e., are coupled to relatively few memory devices relative to a conventional memory system, for example see FIGS. 2A and 2B) and connect to an I/O interface (not shown) of each memory device via a short stub. Signal lines of channels $415a$ and $415b$ include control lines (RQ), data lines (DQ) and clock lines (CFM, CTM). The varieties of interconnect topologies, interconnect types, clocking methods, signaling references, signaling methods, and signaling apparatus described above in reference to two-on-one links $320a$-$320n$ may equally apply to channels $415a$ and $415b$.

In accordance with exemplary embodiments, control lines (RQ) transport control (e.g., read, write, precharge . . . ) information and address (e.g., row and column) information contained in packets. By bundling control and address information in packets, protocols required to communicate to memory devices $410a$-$410h$ are independent of the physical control/address interface implementation.

Figure 6A:
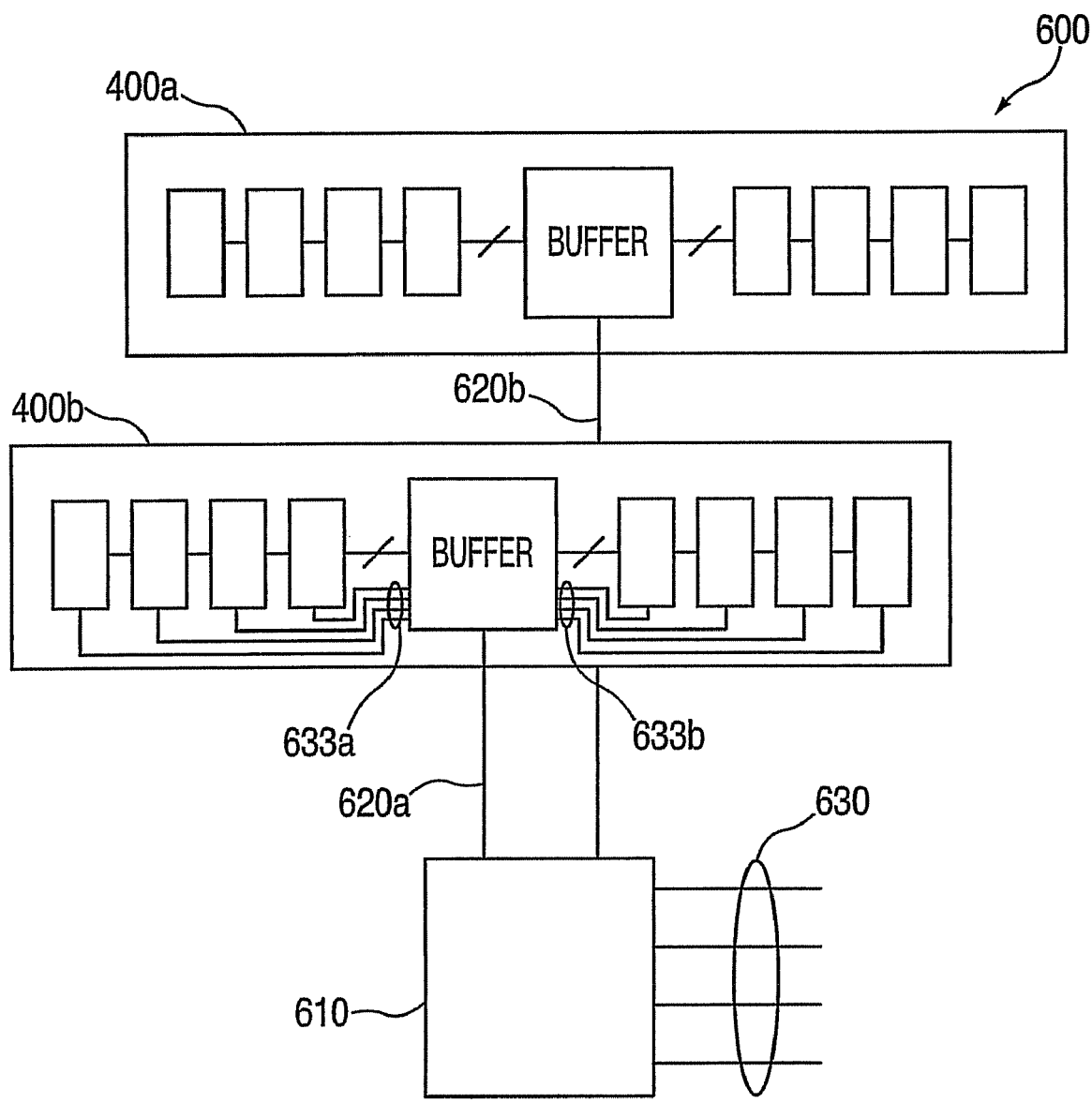
FIGS. 6A and 6B illustrate block diagrams of a memory system according to other embodiments of the present invention.

In alternate embodiments, control lines (RQ) may comprise individual control lines, for example, row address strobe, column address strobe, etc., and address lines. Individual two-on-one control and address lines increase the number of parallel signal connection paths, thereby increasing system layout resource requirements with respect to a narrow "packet protocol" approach. In alternate exemplary embodiments, such as illustrated in FIG. 6A, individual device select lines $633a$ and $633b$ are employed to perform device selection. Individual device select lines $633a$ and $633b$ decrease some latency consumed by decoding device identification which normally is utilized when multiple devices share the same channel and incorporate individual device identification values.

Clock lines of channels $415a$ and $415b$ include a terminated clock-to-master (CTM) (i.e., clock to buffer) and clock-from-master (CFM) (i.e., clock from buffer) line. In a source synchronous clocking method, CTM may be transition or edge aligned with control and/or data communicated to buffer device $405$ from one or more of memory devices $410a$-$410d$ in, for example, a read operation. CFM may be aligned with or used to synchronize control and/or data from the memory buffer-to-buffer device $405$ in, for example, a write operation.

Although two channels $415a$ and $415b$ are shown in FIG. 4A, a single channel is also feasible. In other embodiments, more than two channels may be incorporated onto module $400$. It is conceivable that if each channel and memory device interface is made narrow enough, then a dedicated channel between each memory device and the buffer device may be implemented on the module. The width of the channel refers to the number of parallel signal paths included in each channel. FIG. 4B illustrates a quad-channel module $450$ having channels $415a$-$415d$. In this embodiment, channels $415c$ and $415d$ are routed in parallel with channels $415a$ and $415b$ to support more memory devices (e.g., 32 memory devices). By incorporating more channels and additional memory devices, module $400$ (FIG. 4B) may be implemented in memory systems that require large memory capacity, for example, in server or workstation class systems.

In alternate embodiments, channels $415a$ and $415b$ may operate simultaneously with channels $415c$ and $415d$ to realize greater bandwidth. By operating a plurality of channels in parallel, the bandwidth of the module may be increased independently of the memory capacity. The advantages of greater bandwidth may be realized in conjunction with larger capacity as more modules incorporated the memory system $305$ (see FIG. 3B) increase the system memory capacity. In other alternate embodiments, the modules are double sided and channels along with corresponding pluralities of memory devices are implemented on both sides. Using both sides of the module increases capacity or increases bandwidth without impacting module height. Both capacity and bandwidth may increase using this approach. Indeed, these techniques may increase capacity and bandwidth singly or in combination.

Other features may also be incorporated to enhance module $400$ in high capacity memory systems, for example, additional memory devices and interface signals for error correction code storage and transport (ECC). Referring to FIG. 4C, memory devices 410l and 410r intended for ECC are disposed on module 470.

In one embodiment, memory devices 410a-410h are Rambus Dynamic Random Access Memory (RDRAM) devices operating at a data rate of 1066 Mbits/sec. Other memory devices may be implemented on module 400, for example, Double Data Rate (DDR) DRAM devices and Synchronous DRAM (SDRAM) devices. Utilizing buffer device 405 between the memory devices and controller in accordance with exemplary embodiments (e.g., see FIG. 3) may feasibly render the type of memory device transparent to the system. Different types of memory devices may be included on different modules within a memory system, by employing buffer device 405 to translate protocols employed by controller 310 to the protocol utilized in a particular memory device implementation.

Figure 5:
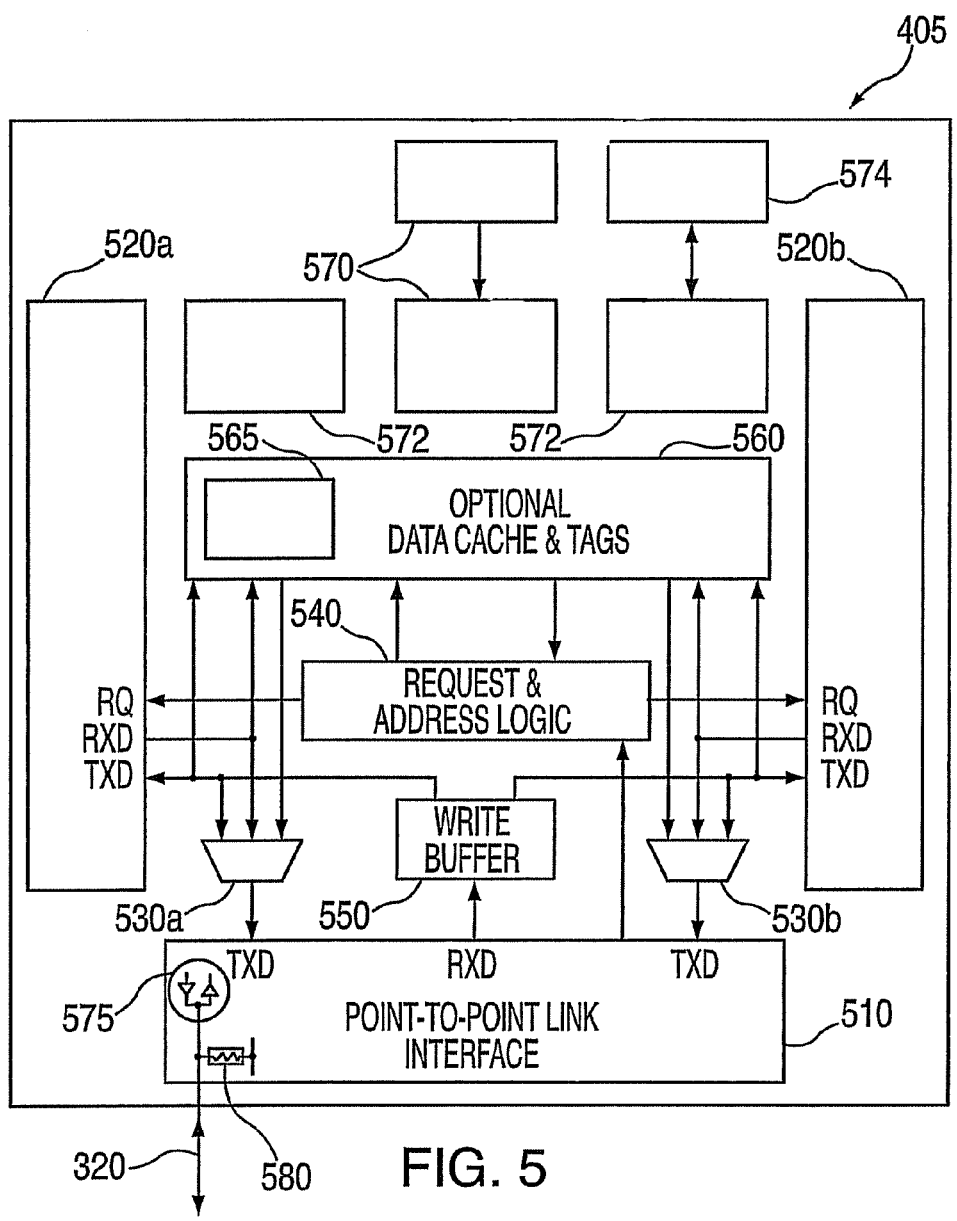
FIG. 5 illustrates a block diagram of a buffer device according to another embodiment of the present invention.

With reference to FIG. 5, a block diagram of a buffer device according to exemplary embodiments is illustrated. Buffer device 405 includes interface 510, interface 520a and 520b, multiplexing 530a and 530b, control logic 540, write buffer 550, optional cache 560, computation block 565, clock circuitry 570 and operations circuitry 572.

In exemplary embodiments, interface 510 couples to external two-on-one link 320 (e.g., two-on-one links 320a-320n in FIGS. 3A and 3B). Interface 510 includes a port having transceiver 575 (i.e. transmit and receive circuitry) that connects to a two-on-one link. Two-on-one link 320 comprises one or a plurality of signal lines, each signal line having more than two transceiver connection points. At least one of the three transceiver connection points is included on interface 510. Buffer device 405 may include additional ports to couple additional two-on-one links between buffer device 405 and other buffer devices on other memory modules. These additional ports may be employed to expand memory capacity as is described in more detail below. In the embodiment shown in FIG. 5, buffer device 405 may function as a transceiver between two-on-one link 320 and other two-on-one links.

In exemplary embodiments, termination 580 is disposed on buffer device 405 and is connected to transceiver 575 and two-on-one link 320. In this embodiment, transceiver 575 includes an output driver and a receiver. In alternate embodiments, transceiver 575 includes two or more output drivers and/or two or more receivers. Termination 580 may dissipate signal energy reflected (i.e., a voltage reflection) from transceiver 575. Termination 580 may be a resistor or capacitor or inductor, singly or a series/parallel combination thereof. In alternate embodiments, termination 580 may be external to buffer device 405. For example, termination 580 may be disposed on a module substrate or on a memory system substrate.

In another approach, signal energy reflected from transceiver 575 may be utilized in a constructive manner according to an embodiment. By correctly placing a receive point spaced by a distance from the end of two-on-one link 320, a reflected waveform is summed with an incident waveform to achieve a greater signal amplitude. In this approach, layout space may be saved by eliminating termination 580. System power may also be saved using this approach since smaller incident voltage amplitude waveforms may be employed. This approach may be equally applicable to the transceiver end of the two-on-one link, or to channels 415a and 415b (see FIGS. 4A to 4C).

With further reference to FIG. 5, interfaces 520a and 520b receive and transmit to memory devices disposed on the module (e.g., see FIGS. 4A, 4B and 4C) via channels. Ports included on interfaces 520a and 520b connect to each channel. In alternate embodiments of the present invention, interfaces 520a and 520b include any number of channels e.g., two, four, eight or more channels.

According to exemplary embodiments, multiplexers 530a and 530b perform bandwidth-concentrating operations, between interface 510 and interfaces 520a and 520b. The concept of bandwidth concentration involves combining the (smaller) bandwidth of each channel in a multiple channel embodiment to match the (higher) overall bandwidth utilized in a smaller group of channels. This approach typically utilizes multiplexing and demultiplexing of throughput between the multiple channels and smaller group of channels. In exemplary embodiments, buffer device 405 utilizes the combined bandwidth of interfaces 520a and 520b to match the bandwidth of interface 510. Bandwidth concentration is described in more detail below.

Cache 560 is one performance enhancing feature that may be incorporated onto buffer device 405. Employing a cache 560 may improve memory access time by providing storage of most frequently referenced data and associated tag addresses with lower access latency characteristics than those of the memory devices. Computation block 565 may include a processor or controller unit, a compression/decompression engine, etc, to further enhance the performance and/or functionality of the buffer device. In exemplary embodiments, write buffer 550 may improve interfacing efficiency by utilizing available data transport windows over two-on-one link 320 to receive write data and optional address/mask information. Once received, this information is temporarily stored in write buffer 550 until it is ready to be transferred to at least one memory device over interfaces 520a and 520b.

A serial interface 574 may be employed to couple signals utilized in initialization of module or memory device identification values, test function, set/reset, access latency values, vendor specific functions or calibration. Operations circuitry 572 may include registers or a read-only memory (ROM) to store special information (e.g., vendor or configuration information) that may be used by the controller. Operations circuitry may reduce costs by eliminating the need for separate devices on the module conventionally provided to perform these features (e.g., serial presence detect (SPD) employed in some conventional DIMM modules).

According to exemplary embodiments, sideband signals are employed to handle special functions such as reset, initialization and power management functions. Sideband signals are connected via serial interface 574 and are independent from two-on-one link 320 for handling the special functions. In other embodiments sideband signals are independently coupled to memory devices 410a-410h to directly promote initialization, reset, power-up or other functionality independently of buffer device 405. Other interconnect topologies of sideband signals are possible. For example, sideband signals may be daisy chained between buffer devices and coupled to the memory controller or daisy chained between all memory devices to the memory controller. Alternatively, dedicated sideband signals may be employed throughout.

Clock circuitry 570 may include clock generator circuitry (e.g., Direct Rambus Clock Generator) which may be incorporated onto buffer device 405 and thus may eliminate the need for a separate clock generating device. Here, module or system costs may be decreased since the need for a unique clock generator device on the module or in the system may be eliminated. Since reliability to provide adequate clocking on an external device is eliminated, complexity is reduced since the clock may be generated on the buffer device 570. By way of comparison, some of the conventional DIMM modules require a phase lock loop (PLL) generator device to generate phase aligned clock signals for each memory device disposed on the module.

According to exemplary embodiments, clocking circuitry 570 includes one or more clock alignment circuits for phase or delay adjusting internal clock signals with respect to an external clock (not shown). Clock alignment circuitry may utilize an external clock from an existing clock generator, or an internal clock generator to provide an internal clock, to generate internal synchronizing clock signals having a predetermined temporal relationship.

Figure 6B:
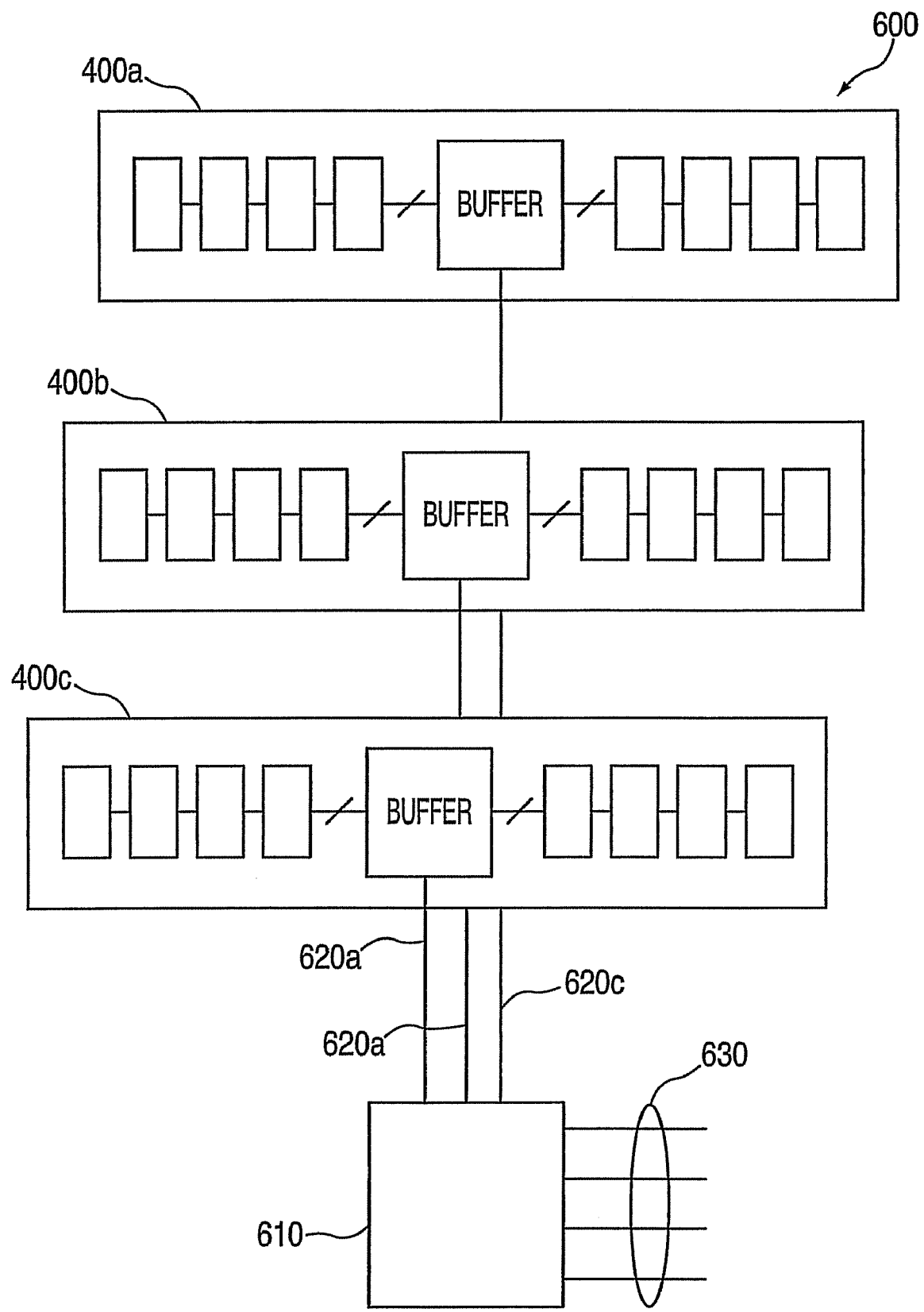

With reference to FIGS. 6A, and 6B, block diagrams of a memory system according to exemplary embodiments are illustrated. Memory system 600 includes modules 400a and 400b, controller 610, and populated primary two-on-one links 620a and 620b. Unpopulated primary two-on-one links 630 are populated by coupling additional modules (not shown) thereto. The additional modules may be provided to upgrade memory system 600. Connectors may be disposed at an end of each primary two-on-one link to allow insertion or removal of the additional modules. Modules 400a and 400b may also be provided with a connector or may be fixedly disposed (i.e., soldered) in memory system 600. Although only two populated primary two-on-one links are shown in FIG. 6A, any number of primary two-on-one links may be disposed in memory system 600, for example, three primary two-on-one links 400a-400c, as shown in FIG. 6B.

Figure 7:
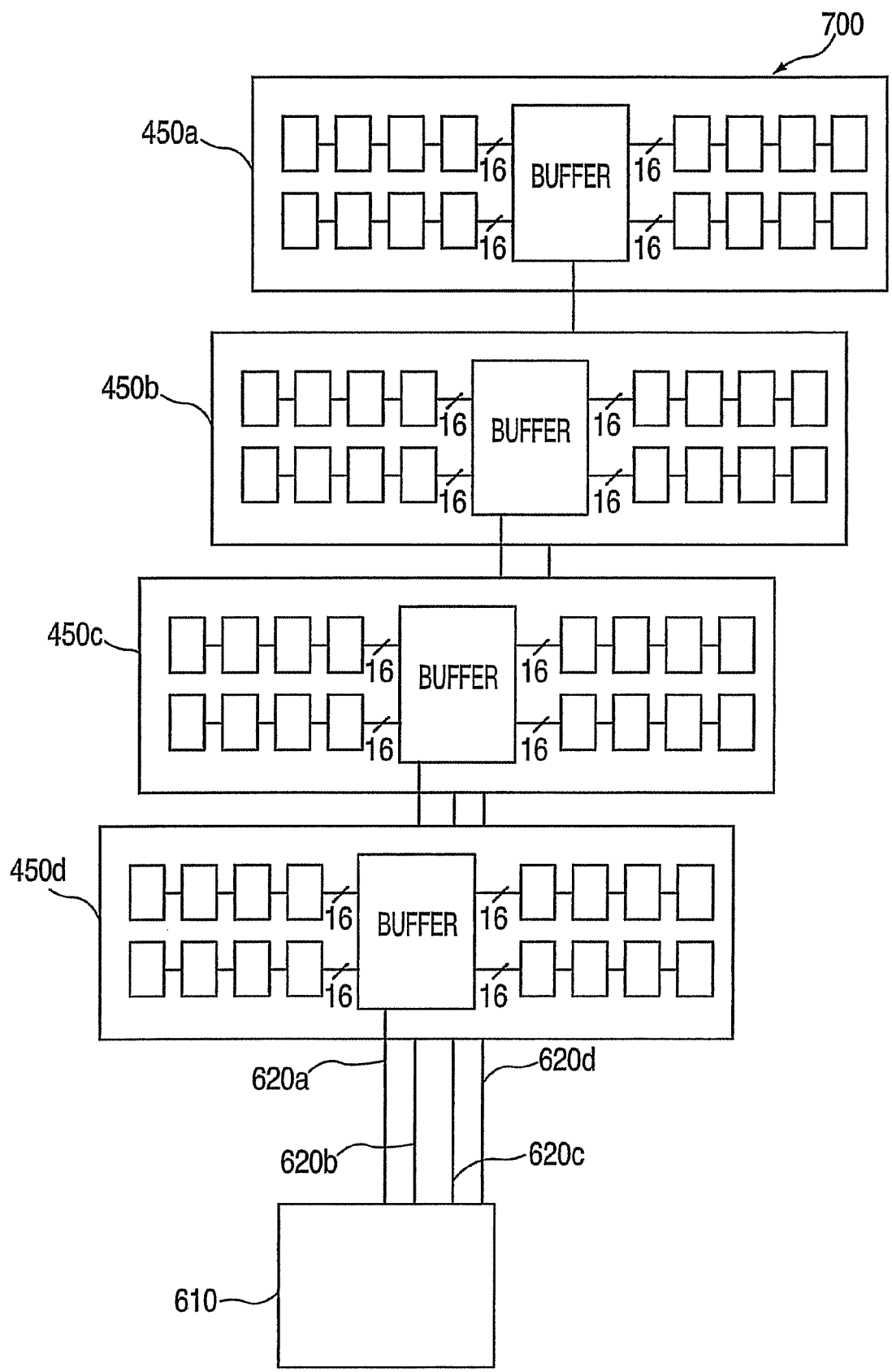
FIG. 7 illustrates a block diagram of a memory system employing a buffered quad-channel module according to an embodiment of the present invention.

With reference to FIG. 7 and FIG. 4B, a block diagram of a memory system employing a buffered quad-channel module according to an embodiment of the present invention is illustrated. Memory systems 700 incorporate quad-channel modules 450a-450d, each coupled via two-on-one links 620a-620d respectively.

Referring to FIG. 4B, buffer device 405 may operate in a bandwidth concentrator approach. By employing quad channels 415a-415d on each of modules 450a-450d, bandwidth in each module may be concentrated from all quad channels 415a-415d on each module to corresponding two-on-one links 620a-620d. In this embodiment, throughput on each of two-on-one links 620a-620d is concentrated to four times the throughput achieved on each of quad channels 415a-415d. Here, each of channels 415a-415d transfers information between one or more respective memory devices on each channel and buffer device 405 simultaneously.

Any number of channels 415a-415d, for example; two channels 415c and 415d may transfer information simultaneously and the memory devices on the other two channels 415a and 415b remain in a ready or standby state until called upon to perform memory access operations. Different applications may have different processing throughput requirements. In addition, the throughput requirements of a particular application may dynamically change during processing. Typically, more power is consumed as throughput is increased as power consumption relates in proportion to operation frequency. The amount of throughput in a system may be implemented on a dynamic throughput requirement basis to save on power consumption. In this embodiment, memory system 700 may concentrate bandwidth as it is required while in operation. For example, memory system 700 may employ only one of channels 415a-415d and match throughput to the corresponding two-on-one link. As bandwidth requirements increase, memory system 700 may dynamically activate more of channels 415a-415d and increase the throughput on the two-on-one link along with the number of channels accordingly to meet the bandwidth requirements for a given operation.

Figure 8A:
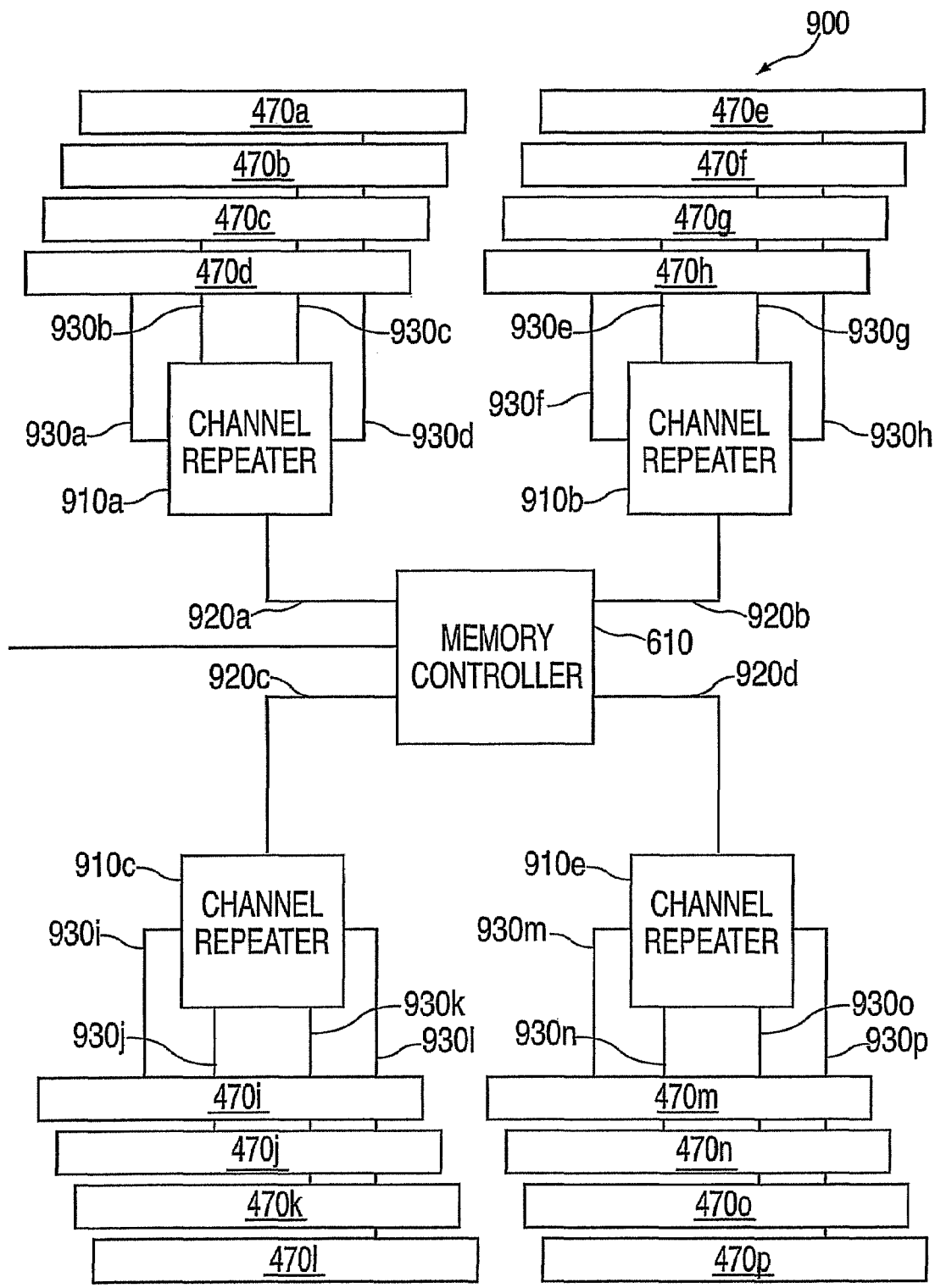
FIG. 8A illustrates a block diagram of a large capacity memory system according to another embodiment of the present invention.

With reference to FIG. 8A, a block diagram of a large capacity memory system according to exemplary embodiments is illustrated. Memory system 900 includes modules 470a-470p, coupled to controller 610 via repeaters 910a-910d, primary links 920a-920d, and repeater links 930a-930p. Primary links 920a-920d provide a two-on-one link between controller 610 and a respective repeater 910a-910d. In exemplary embodiments, each of repeaters 910a-910d decode packets transmitted from controller 610 which are then directed over one or more, or none of repeater links 930a-d, depending the type of access required. Each repeater link 930a-930p may utilize a two-on-one link configuration. By incorporating, repeated links 930a-930p and repeaters 910a-910d, a larger number of modules may be accessed and a larger capacity memory system may be realized. Such a large capacity may be suited in a computer server system.

Figure 8B:
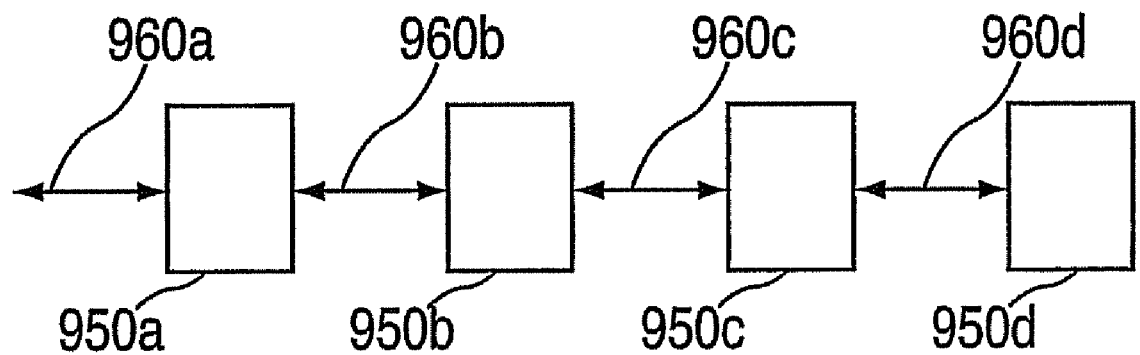
FIGS. 8B and 8C illustrate another approach utilized to expand the memory capacity of a memory system in accordance to yet another embodiment of the present invention.
Figure 8C:
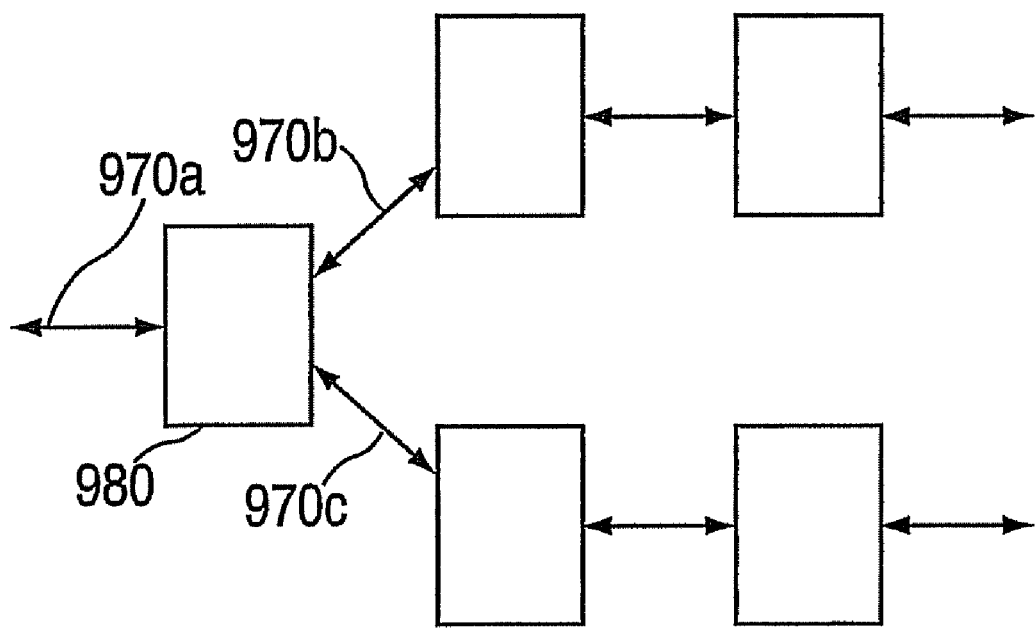

FIG. 8B illustrates another approach utilized to expand the memory capacity of a memory system in accordance to yet other exemplary embodiments. Here, a plurality of buffered modules 950a-950d are "daisy chained" via a plurality of two-on-one links 960a-960d to increase the overall memory capacity. Connection points of each two-on-one link are connected to two adjacent buffered modules. Each of buffered modules 950a-950c transceive signals between adjacent two-on-one links 960a-960d. Two-on-one link 960a may be coupled to a controller or another buffered module. Additional two-on-one links may be coupled to a buffer device in a tree configuration approach. For example, three two-on-one links 970a-970c each having a single end connected to one buffer device may be employed as shown in FIG. 8C.

Figure 9:
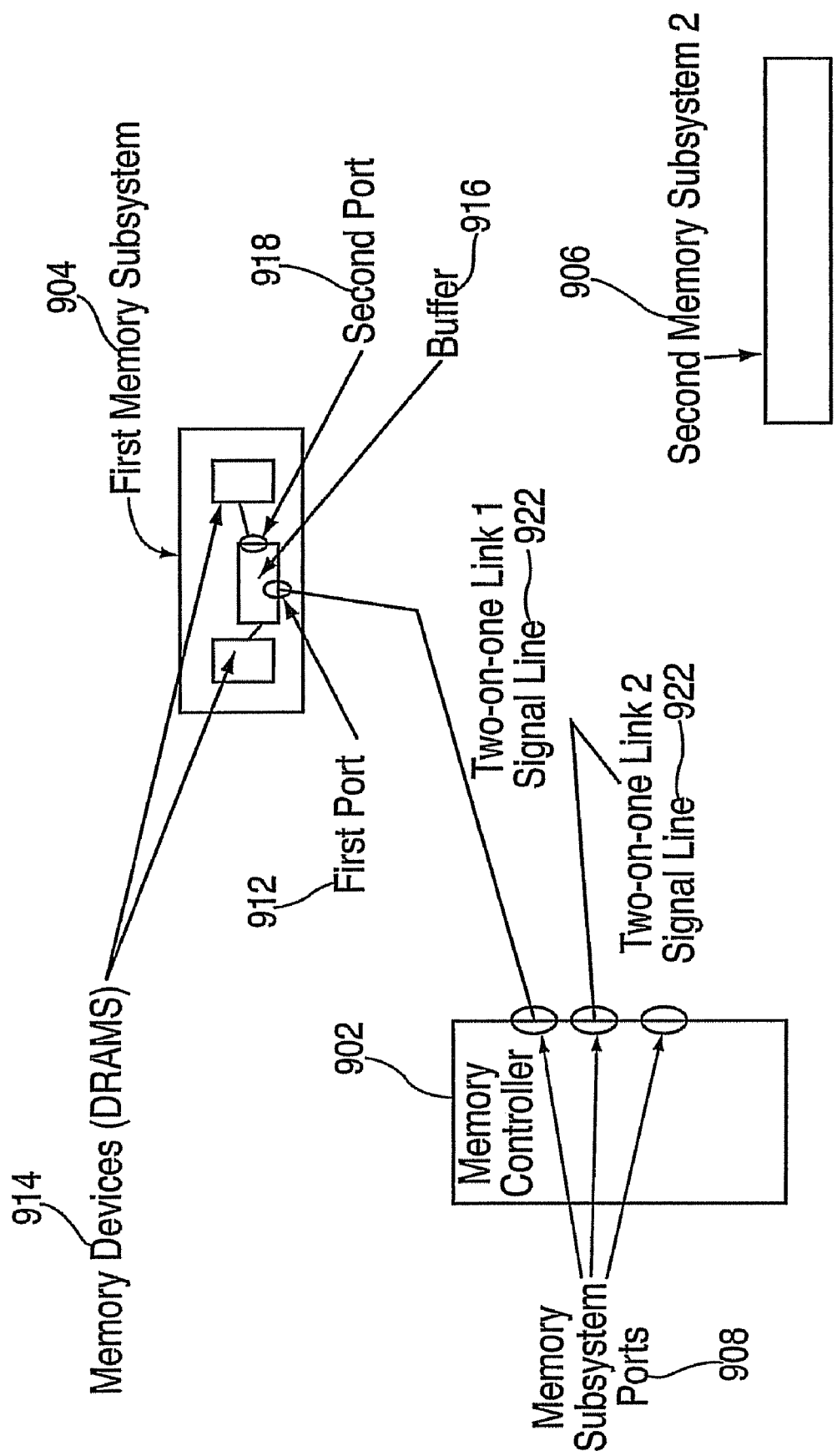
FIG. 9 depicts an exemplary memory system with a plurality of two-on-one links.

FIG. 9 depicts an exemplary memory system with a plurality of two-on-one links. The memory system includes a memory controller 902, a first memory subsystem 904, a second memory subsystem 906, and a plurality of two-on-one link signal lines 922. The memory controller 902 includes an interface with a plurality of memory subsystem ports 908. The first memory subsystem 904 includes a buffer device 916, and a plurality of memory devices 914. The buffer device 916 includes a first port 912 and a second port 918. Data is transferred between at least one of the memory devices 914 and the memory controller 902 via the buffer device 916. Each of the plurality of two-on-one links signal lines 922 is capable of providing connections between a plurality of respective memory subsystems 904 and the memory controller 902. Each two-on-one link signal line 922 has a connection to its respective memory subsystem 904 and a connection to a respective memory subsystem port 908 on the memory controller 902. At least one of these two-on-one link connections is to a transceiver that includes two drivers and/or two receivers. The plurality of two-on-one links signal lines 922 includes a first two-on-one link signal line 922 to connect the first port 912 of the first memory subsystem 904 to the memory controller 902 via a first memory subsystem port 908 (one of the plurality of memory subsystem ports 908).

Figure 10:
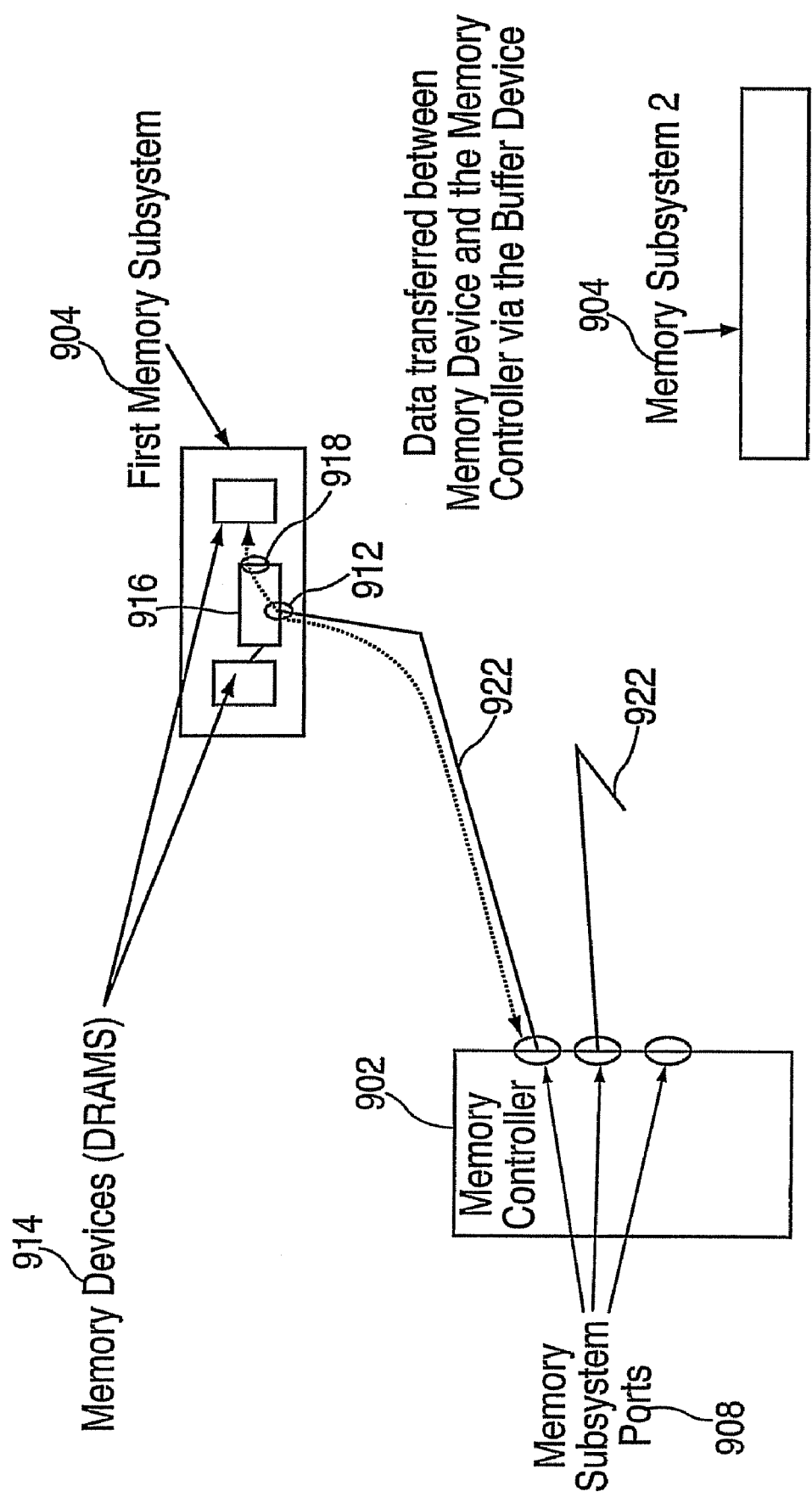
FIG. 10 depicts an exemplary data transfer path in a memory system that includes a two-on-one link.

FIG. 10 depicts an exemplary data transfer path in a memory system that includes a two-on-one link. FIG. 10 is similar to FIG. 9 with the addition of a dotted line representing the flow of data between the memory devices 914 and the memory controller 902, via the buffer device 916. As depicted in FIG. 10, the second port 918 on the buffer device 916 communicates with the memory devices 914 and the first port 912 on the buffer device 916 communicates with the memory subsystem port 908 on the memory controller.

Figure 11:
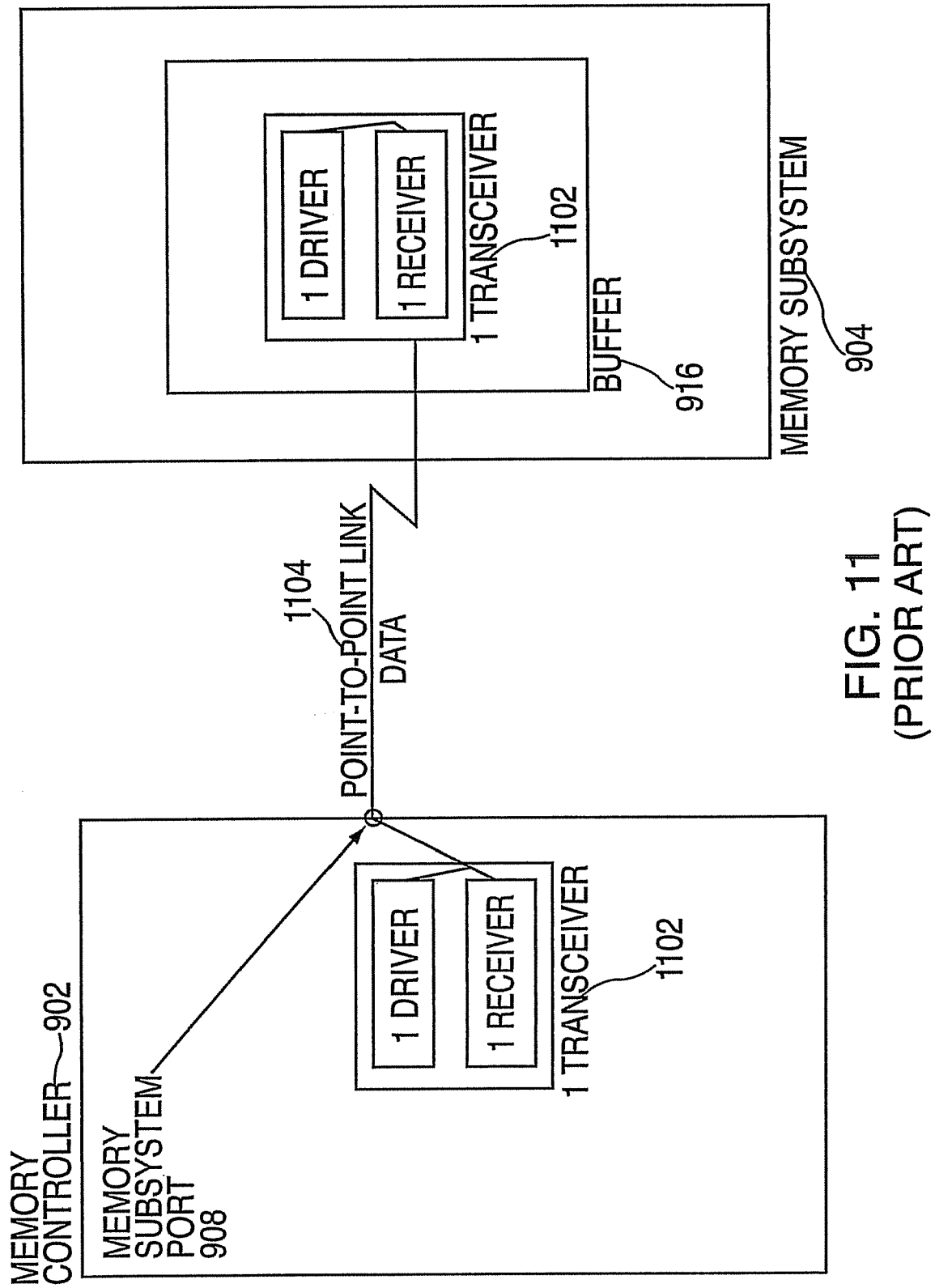
FIG. 11 depicts an exemplary memory system that includes a point-to-point link for transferring data between a memory controller and a memory subsystem of the prior art.

FIG. 11 depicts an exemplary prior art memory system that includes a point-to-point link 1104 for transferring data between a memory controller 902 and a memory subsystem 904. The memory controller includes one transceiver 1102

(with one driver, one receiver, or one driver and one receiver) which is connected to one of the memory subsystem ports 908. The memory subsystem port 908 in the memory controller 902 is in communication with the point-to-point link 1104. The other end of the point-to-point link 1104 is in communication with a port on the buffer device 916 in the memory subsystem 904. The memory subsystem 904 includes a single transceiver 1102 (in the buffer device 916 in the example depicted in FIG. 11). Thus, a point-to-point link 1104 with exactly two connections is implemented. One connection is to the transceiver 1102 in the memory controller 902 and the other connection is to the transceiver 1102 located in the buffer device 904, a point-to-point link 1104 is limited to one transmitter and/or one receiver per transceiver.

Figure 12:
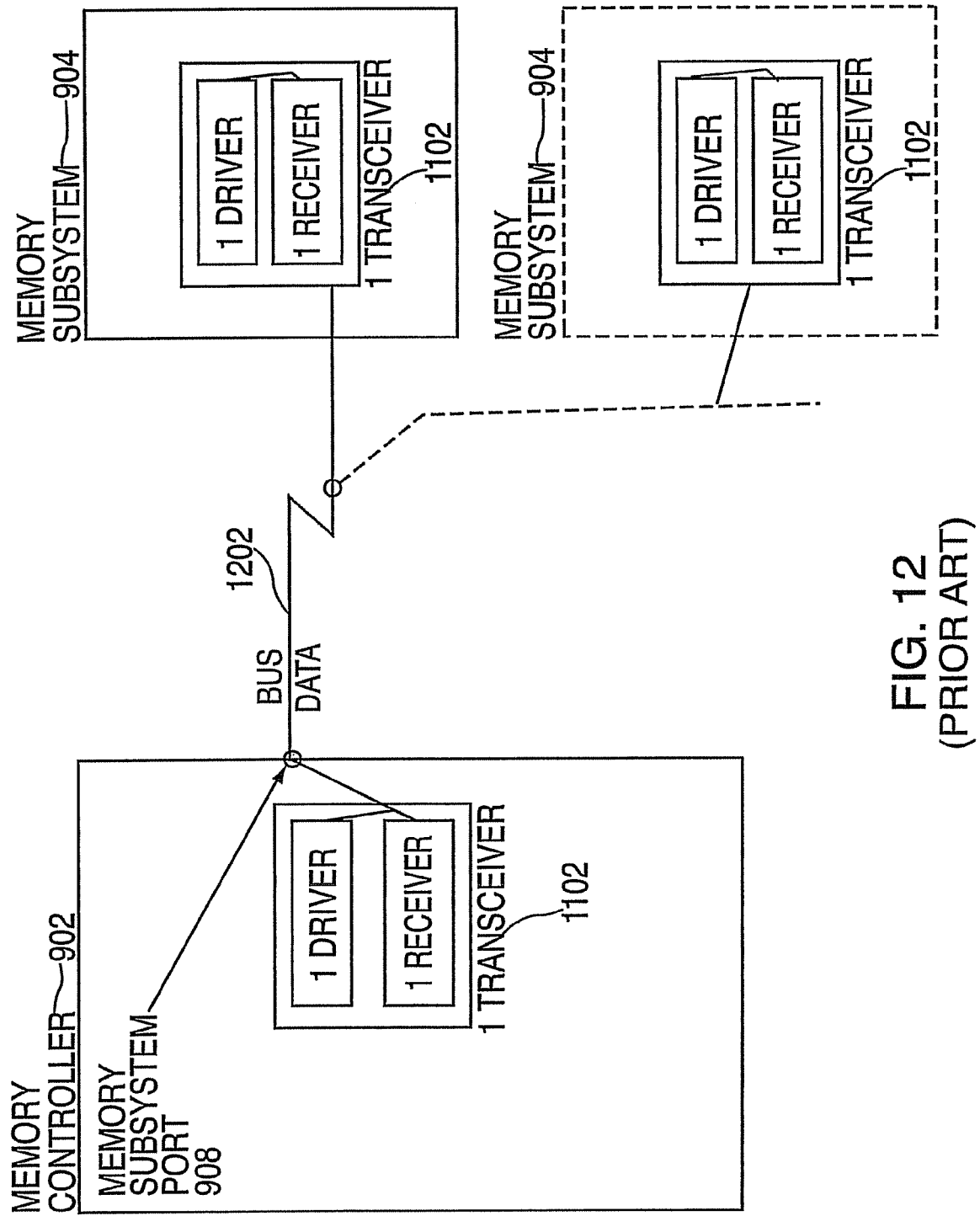
FIG. 12 depicts an exemplary multi-drop bus architecture that includes a bus for transferring data between a memory controller and one or more memory subsystems of the prior art.

FIG. 12 depicts an exemplary prior art multi-drop bus architecture that includes a bus 1202 for transferring data between a memory controller 902 and one or more memory subsystems 904. The memory controller includes one transceiver 1102 which is connected to a memory subsystem port 908. The memory subsystem port 908 in the memory controller 902 is in communication with the bus 1202. The bus is also in communication with ports on the memory subsystems 904. The memory subsystems 904 each include a single transceiver 1102. Thus, a multi-drop bus architecture is implemented. A multi-drop bus is characterized as having the capability of connecting three or more transceivers.

Figure 13:
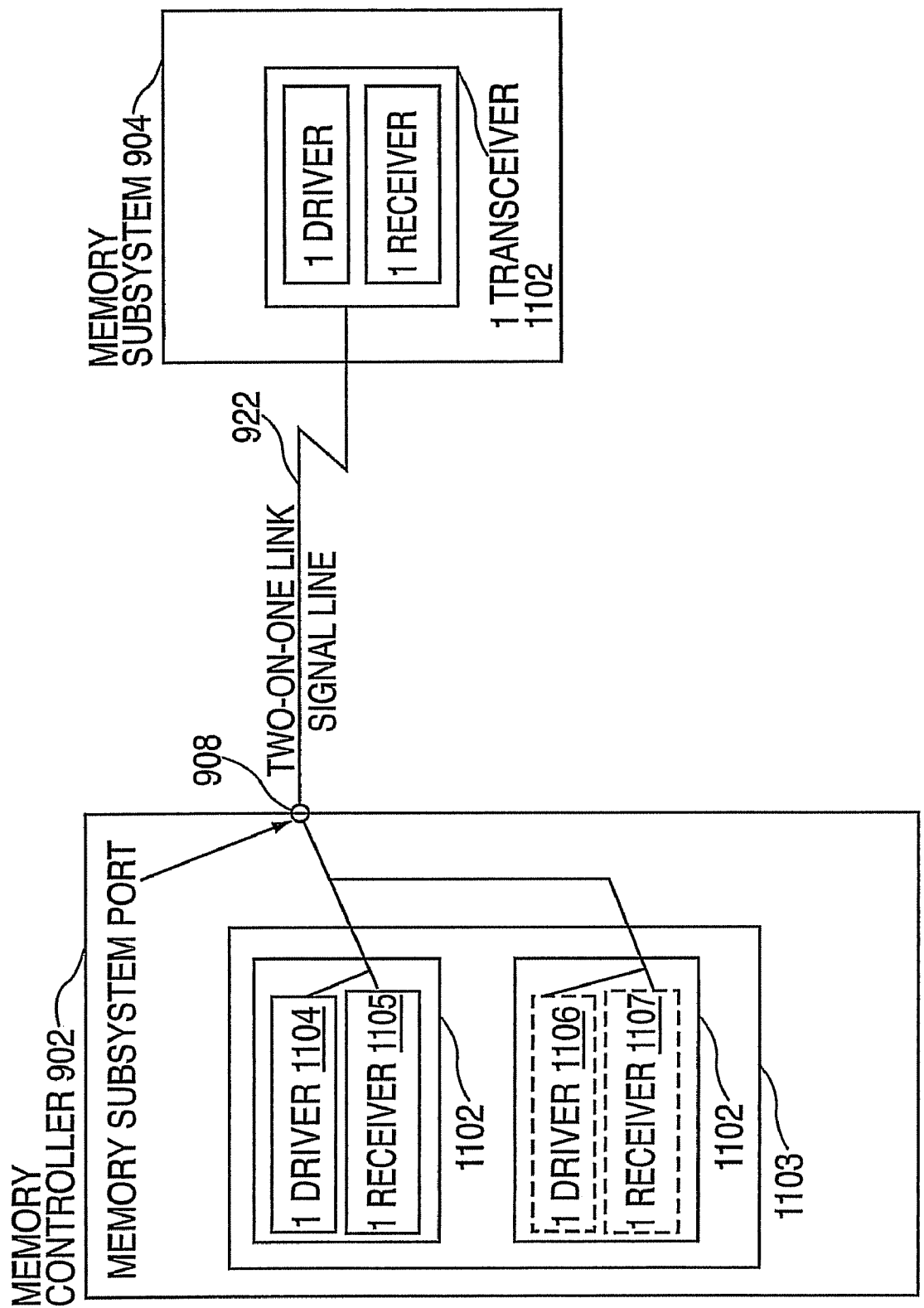
FIG. 13 depicts a memory system with a two-on-one link that may be implemented by exemplary embodiments.

FIG. 13 depicts a memory system with a two-on-one link signal line 922 having two connection points that may be implemented by exemplary embodiments, and at least one transceiver having at least two transmitters and/or at least two receivers. The memory system includes a memory controller 902 and one or more memory subsystems 904. The memory controller 902 is in communication with the memory subsystems 904 for transmitting data and control information. The memory controller 902 includes a memory subsystem port 908 that is in communication with a transceiver 1103 via a two-on-one link signal line 922. The two-on-one link signal line 922 connects the transceiver 1103 in the memory controller 902 to a single transceiver 1102 in the memory subsystem 904. In exemplary embodiments two-on-one link transceiver 1103 is made up of two or more single transceivers 1102. At least one of the driver 1106 and the receiver 1107 is active when the two-on-one link transceiver 1103 is utilized as part of the two-on-one link signal line 922. In exemplary embodiments, the transceiver 1103 in the memory controller 902 receives and/or transmits different data and control signals. This may be implemented by any manner known in the art such as having one of the transmitters 1104 or receivers 1105 sampling (and/or transmitting on) the even cycle inputs and the other sampling (and/or transmitting on) the odd cycle inputs. In alternate exemplary embodiments, the two drivers (1104 1106) and/or the two receivers (1105 1107) in the transceiver 1103 in the memory controller 902 receive the same data and control signals and/or selectively transmit the same data and control signals. This may be implemented to provide back-up for the driver 1104 and/or the receiver 1105.

Figure 14:
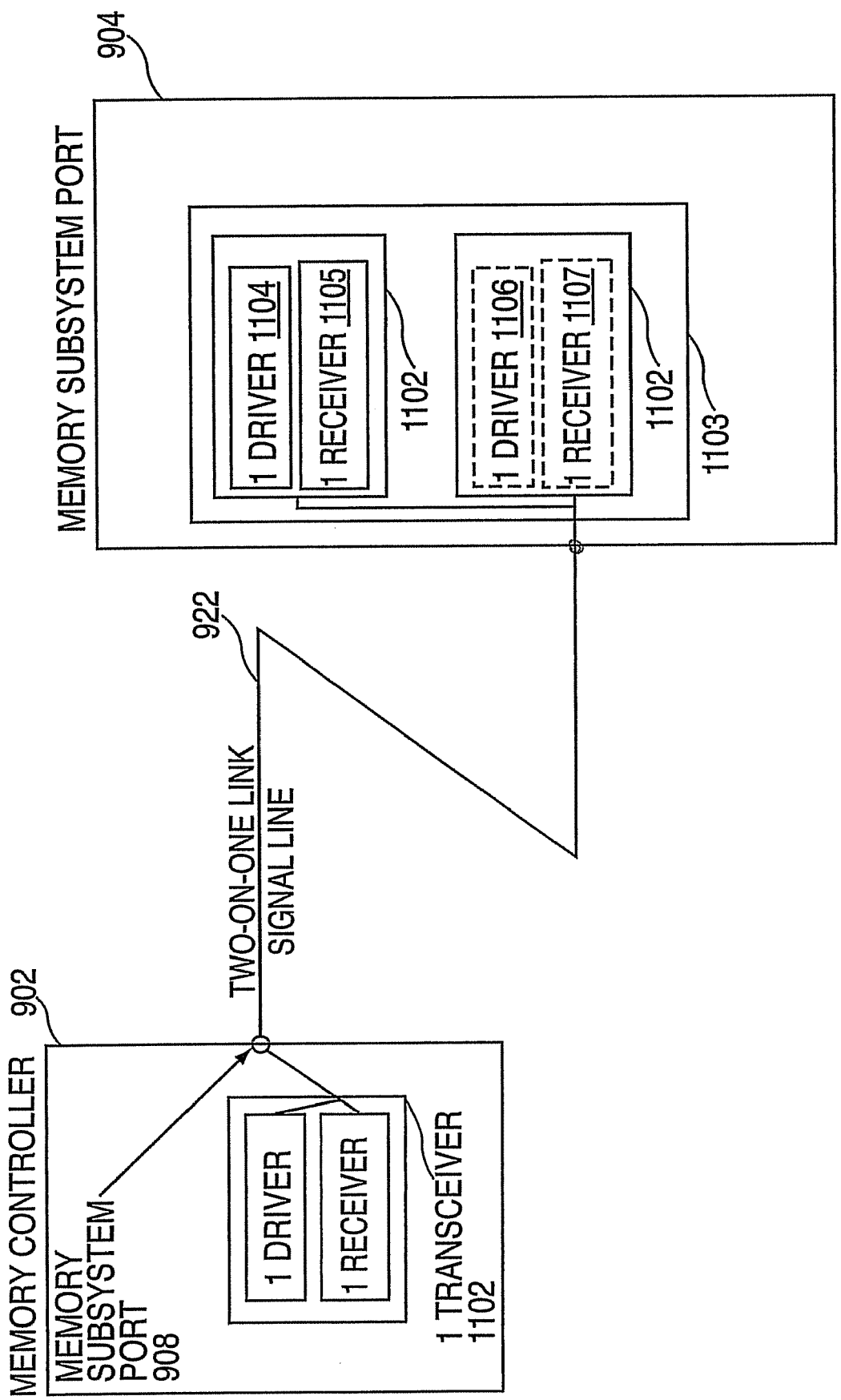
FIG. 14 depicts a memory system with a two-on-one link that may be implemented by exemplary embodiments.

FIG. 14 depicts a memory system with a two-on-one link signal line 922 having two connection points that may be implemented by exemplary embodiments, and at least one two-on-one link transceiver 1103 having at least two transmitters and/or at least two receivers. that may be implemented by exemplary embodiments. The memory system includes a memory controller 902 and one or more memory subsystems 904. The memory controller 902 is in communication with the memory subsystems 904 for transmitting data and control information via a two-on-one link signal line 922. The memory controller 902 includes a memory subsystem port 908 that is in communication with a transceiver 1102. The two-on-one link signal line 922 connects the transceiver 1102 in the memory controller 902 to transceiver 1103 in the memory subsystem 904. In exemplary embodiments, the receivers (1105 1107) and the drivers (1104 1106) in the transceiver 1103 in the memory subsystem 904 receive and/or transmit different data and control signals. This may be implemented by any manner known in the art such as having one of the transmitters 1104 or receivers 1105 sampling (and/or transmitting on) the even cycle inputs and the other sampling (and/or transmitting on) the odd cycle inputs. In alternate exemplary embodiments, the two-on-one link transceiver 1103 in the memory controller 902 receives the same data and control signals and/or selectively transmits the same data and control signals. This may be implemented to provide back-up.

Figure 15:
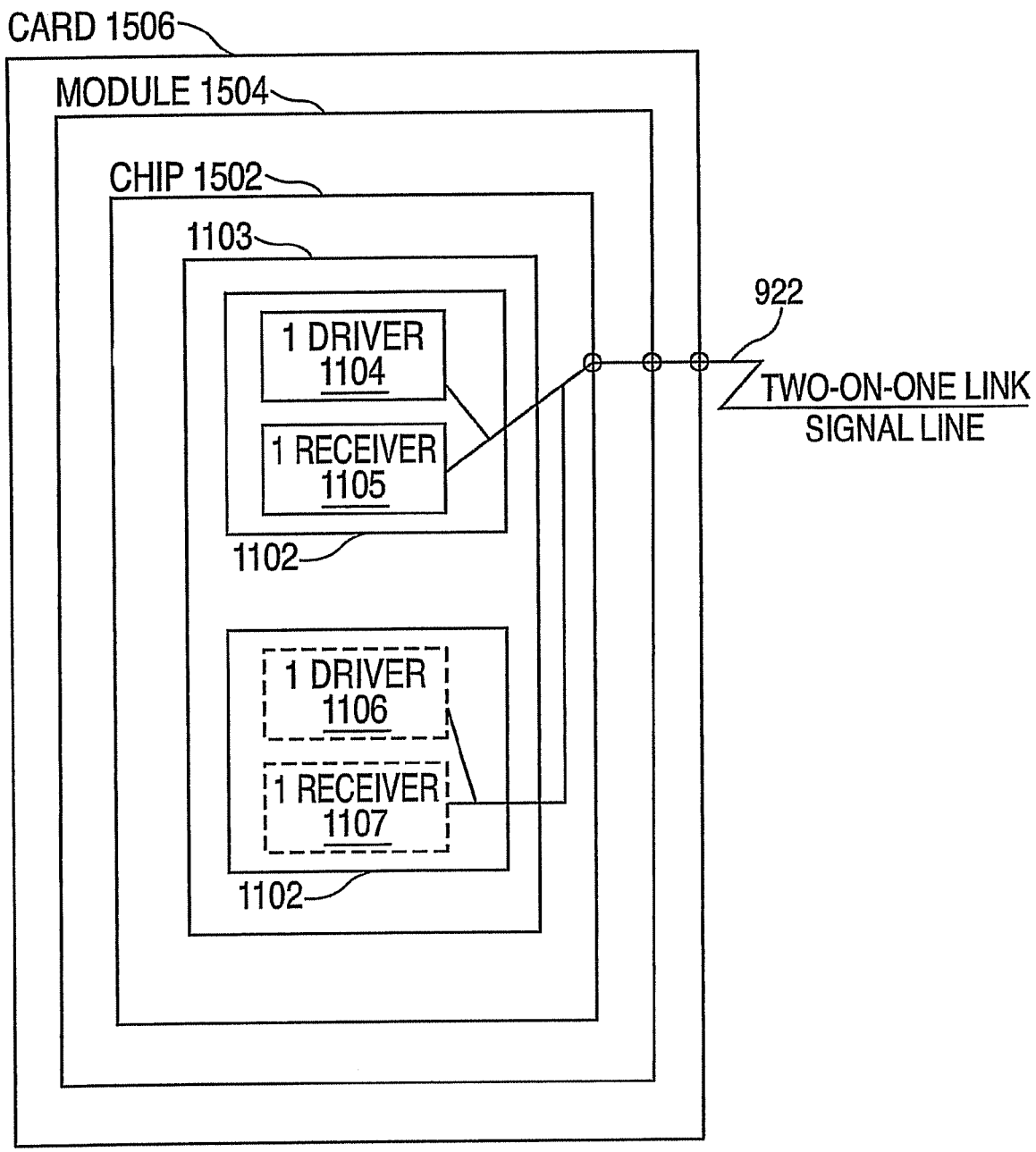
FIG. 15 depicts a memory card with a two-on-one link that may be implemented by exemplary embodiments.

FIG. 15 depicts a memory card 1506 with a two-on-one link signal line 922 having two connection points and a least one two-on-one link transceiver 1103 having at least two transmitters and/or at least two receivers that may be implemented by exemplary embodiments. As depicted in FIG. 15, the single transceivers 1102 located within two-on-one link transceiver 1103 are located on the same integrated circuit, or chip 1502. The chip 1502 is located on a single module 1504, and the module 1504 is located on the memory card 1506. The signals from the two-on-one link signal line 922 are split on the chip 1502. Therefore, only a single pin is required on the chip 1502 for providing communication to the two-on-one link transceiver 1103 in the two-on-one link signal line 922.

Figure 16:
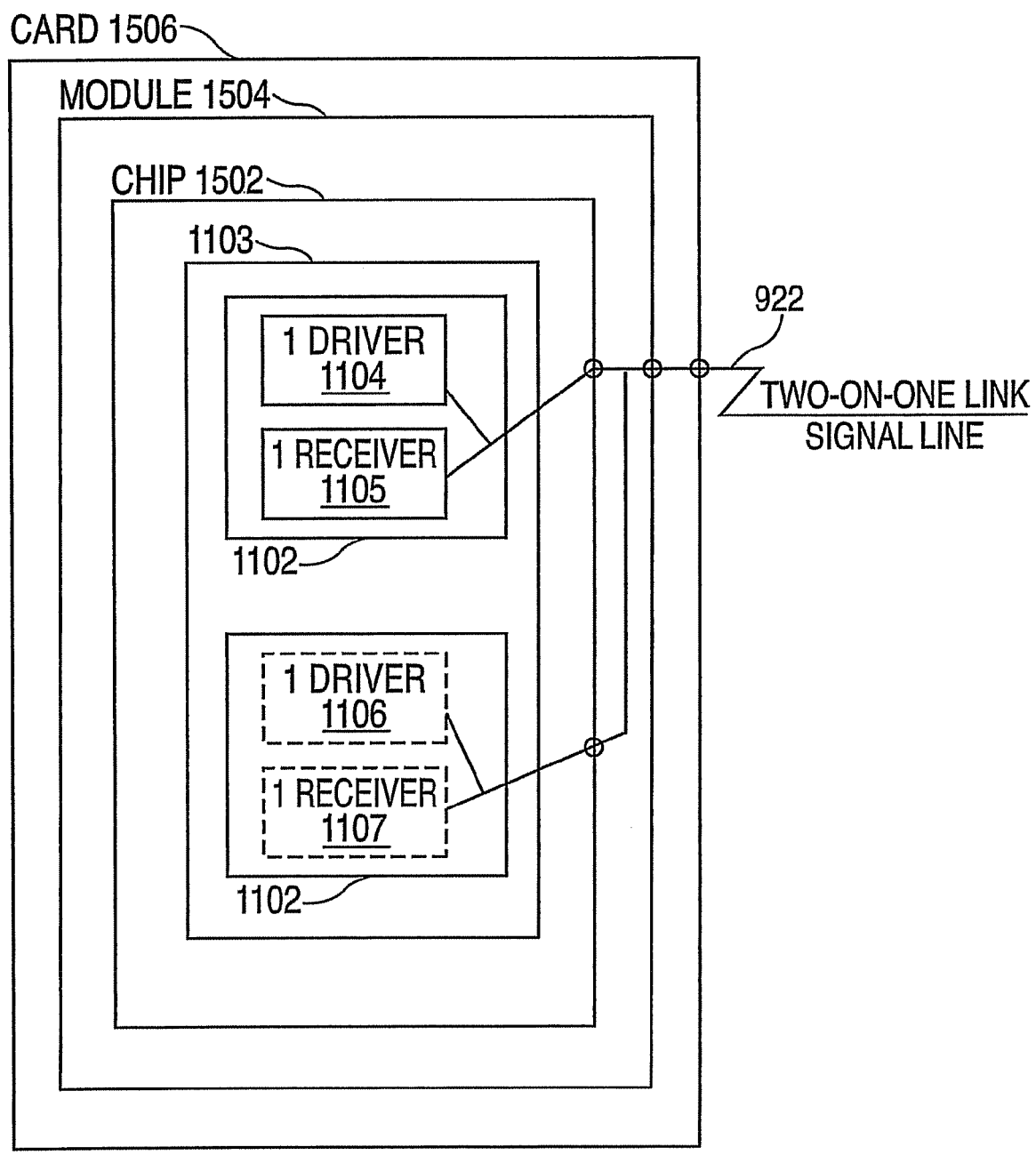
FIG. 16 depicts a memory card with a two-on-one link that may be implemented by exemplary embodiments.

FIG. 16 depicts a memory card 1506 with a two-on-one link signal line 922 having two connection points and at least one two-on-one link transceiver 1103 that may be implemented by exemplary embodiments. As depicted in FIG. 16, the transceivers 1102 with the two-on-one link transceiver 1103 are located on the same integrated circuit, or chip 1502. The chip 1502 is located on a single module 1504, and the module 1504 is located on the memory card 1506. The signals from the two-on-one link signal line 922 are split on the module 1504. Therefore, two pins are required on the chip 1502 for providing communication between the transceivers 1102 and the two-on-one link signal line 922.

Figure 17:
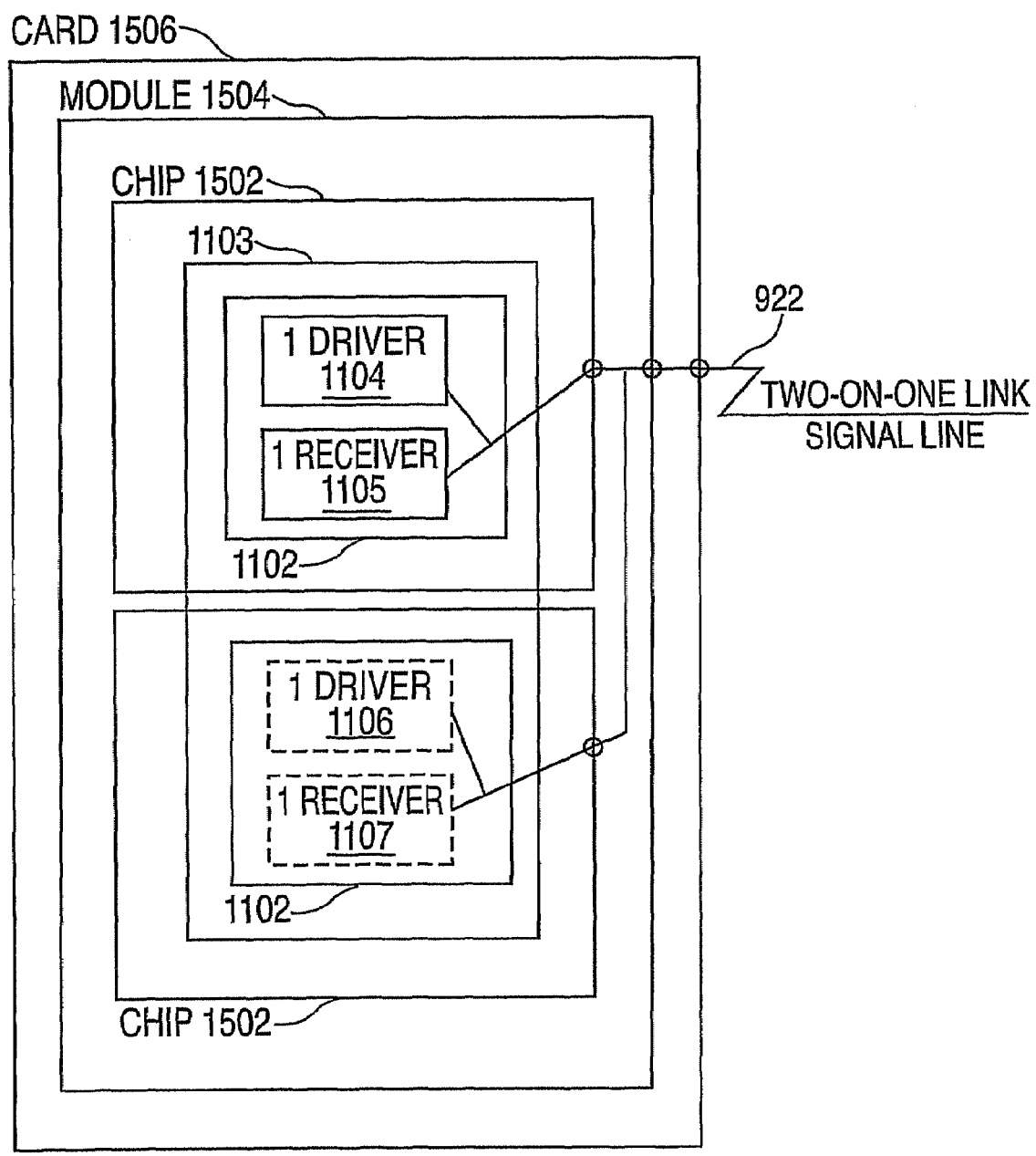
FIG. 17 depicts a memory card with two transceivers in communication with a two-on-one link that may be implemented by exemplary embodiments.

FIG. 17 depicts a memory card 1506 with a two-on-one link transceiver 1103 in communication with two connection points on a two-on-one link signal line 922 that may be implemented by exemplary embodiments. As depicted in FIG. 17, the transceivers 1102 in the two-on-one link transceiver 1103 are located on two different integrated circuits, or chips 1502. The chips 1502 are located on the same module 1504, and the module 1504 is located on the memory card 1506. The signals from the two-on-one link signal line 922 are split on the module 1504. Therefore, a single pin is required into both chips 1502 for providing communication between the transceivers 1102 and the two-on-one link signal line 922.

Figure 18:
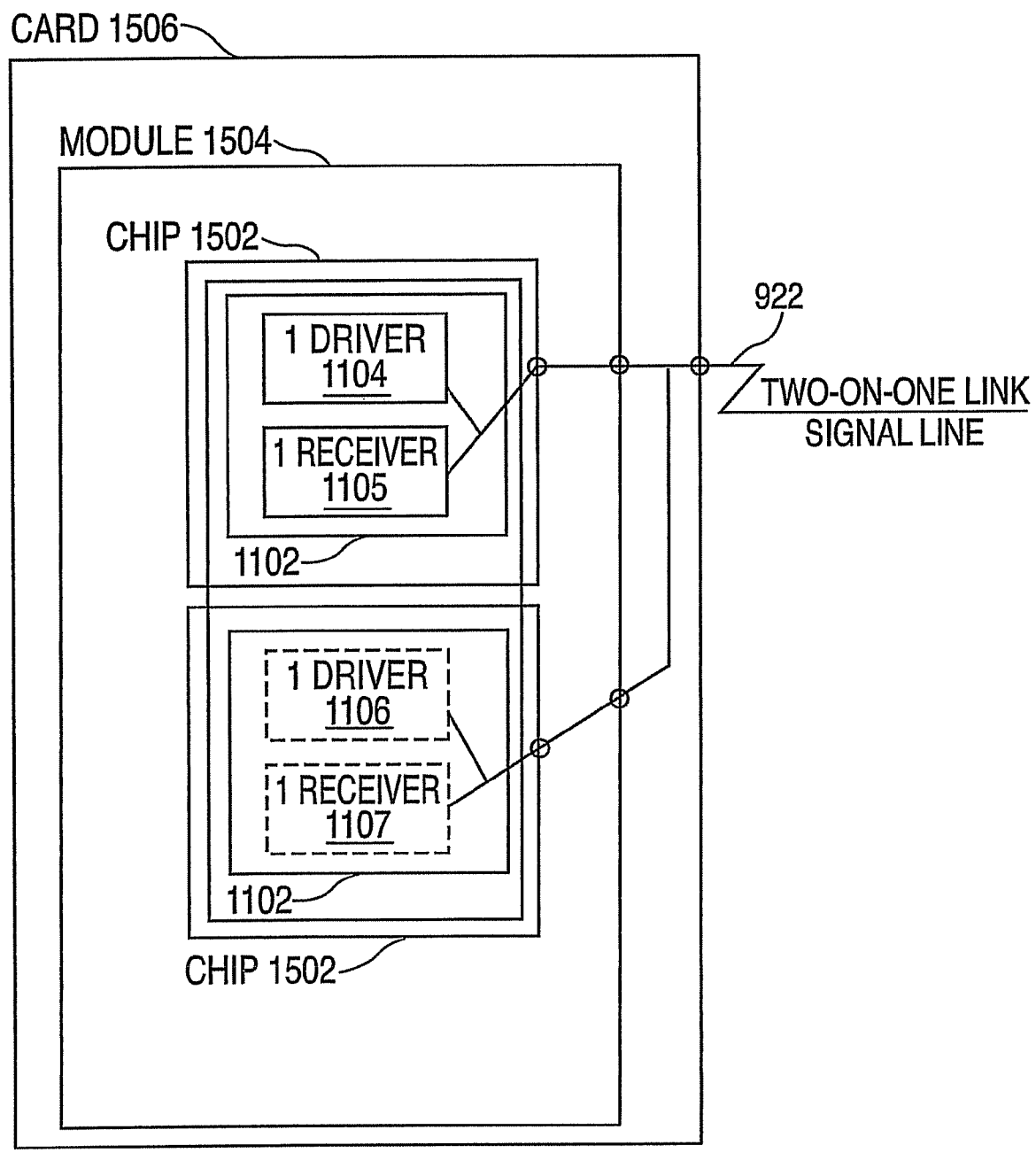
FIG. 18 depicts a memory card with a two-on-one link that may be implemented by exemplary embodiments.

FIG. 18 depicts a memory card 1506 with a two-on-one link transceiver 1103 in communication with two connection points on a two-on-one link signal line 922 that may be implemented by exemplary embodiments. As depicted in FIG. 18, the transceivers 1102 in the two-on-one link transceiver 1103 are located on the same integrated circuit, or chip 1502. The chip 1502 is located on a single module 1504, and the module 1504 is located on the memory card 1506. The signals from the two-on-one link signal line 922 are split on the card 1506. Therefore, two pins are required on the chip 1502 for providing communication between the transceivers 1102 and the two-on-one link signal line 922.

Figure 19:
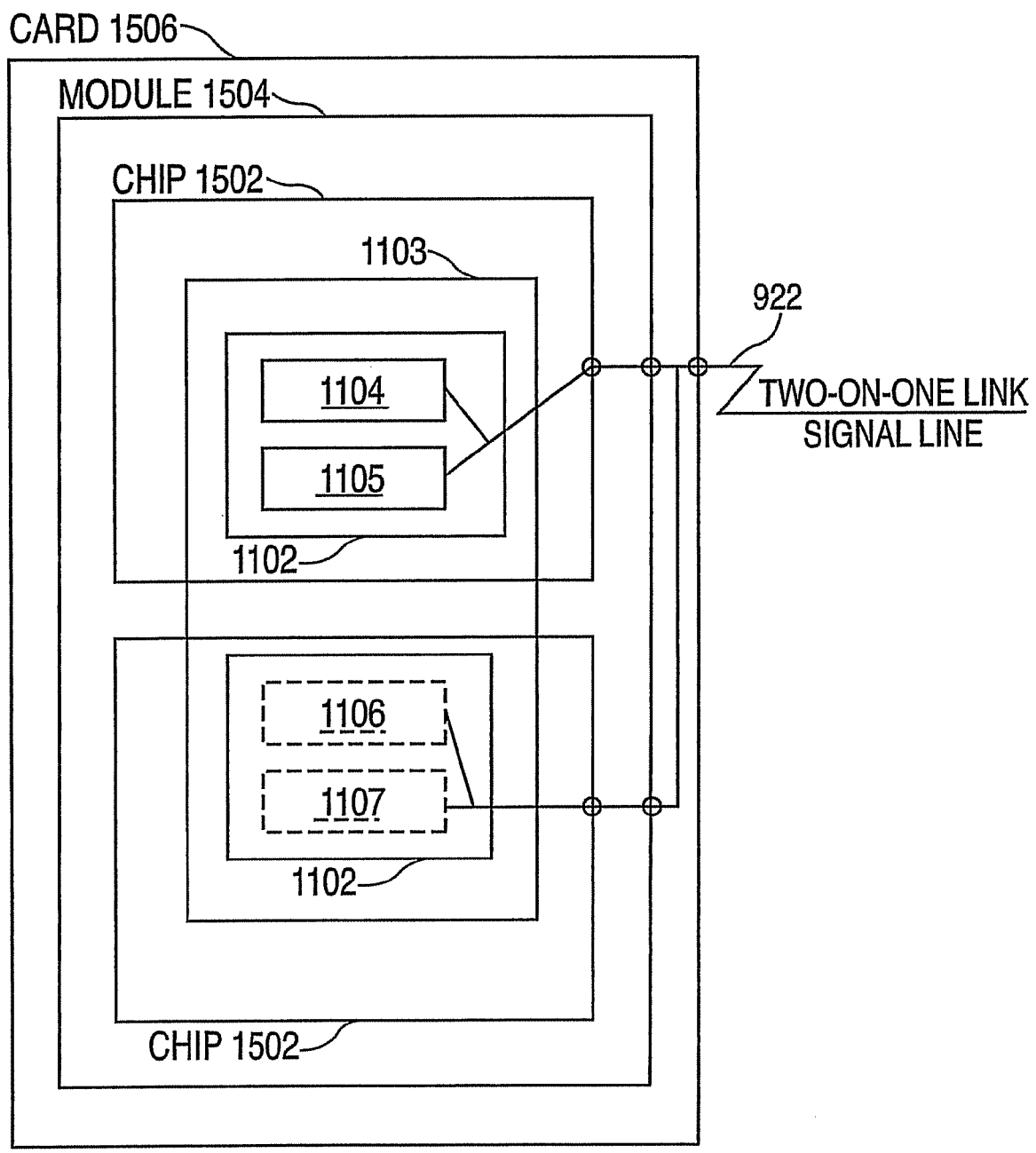
FIG. 19 depicts a memory card with a two-on-one link that may be implemented by exemplary embodiments.

FIG. 19 depicts a memory card 1506 with a two-on-one link transceiver 1103 in communication with two connection points on a two-on-one link signal line 922 that may be implemented by exemplary embodiments. As depicted in FIG. 19, the transceivers 1102 in the two-on-one link transceiver 1103 are located on two different integrated circuits, or chips 1502. The chips 1502 are located on the same module 1504, and the module 1504 is located on the memory card 1506. The signals from the two-on-one link signal line 922 are split on the card 1506. Therefore, a single pin is required into both chips 1502 for providing communication between the transceivers 1102 and the two-on-one link signal line 922.

Figure 20:
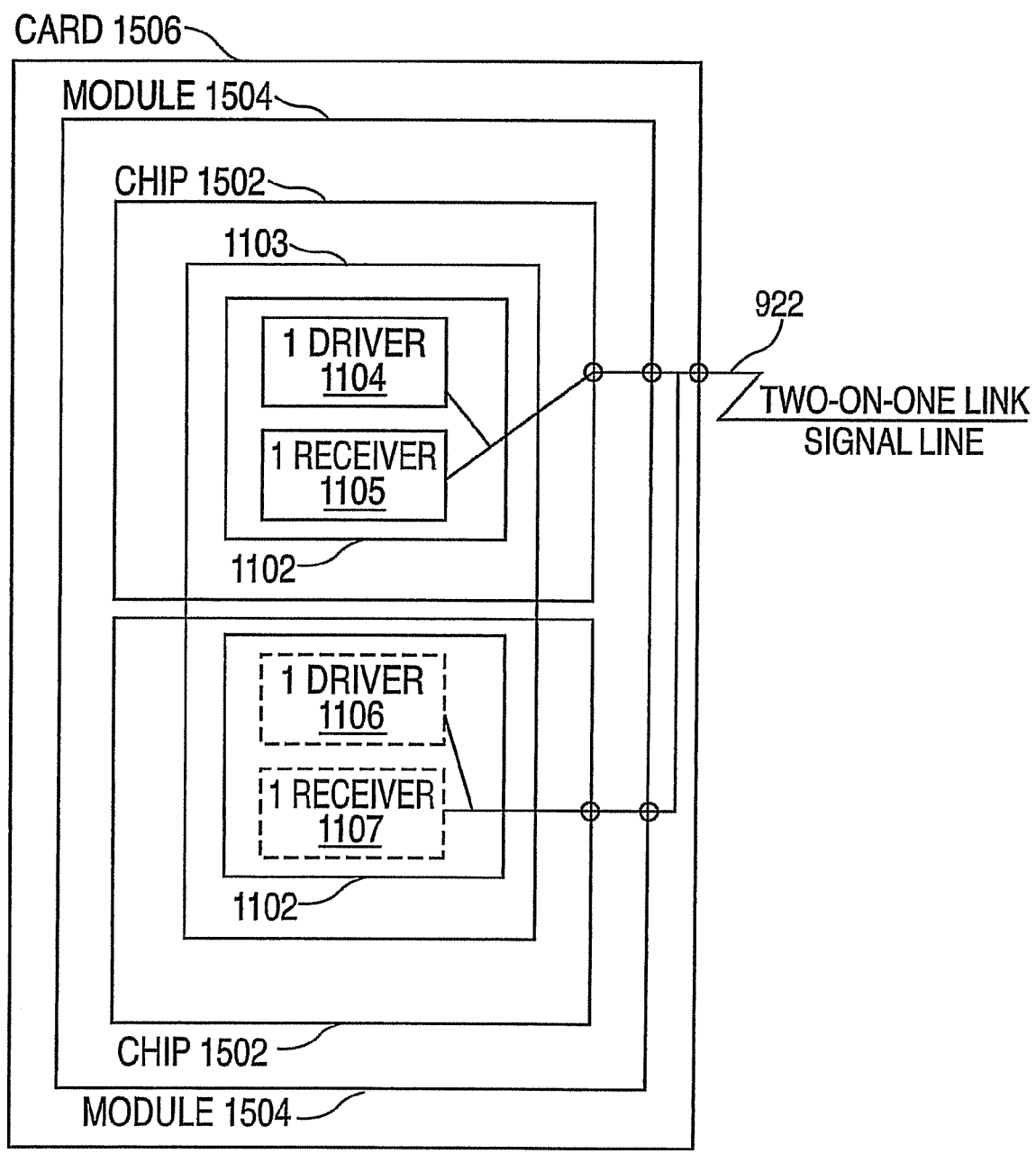
FIG. 20 depicts a memory card with a two-on-one link that may be implemented by exemplary embodiments.

FIG. 20 depicts a memory card 1506 with a two-on-one link transceiver 1103 in communication with two connection points on a two-on-one link signal line 922 that may be implemented by exemplary embodiments. As depicted in FIG. 20, the single transceivers 1102 located with the two-on-one link transceiver 1103 are located on two different modules 1504. Each of the modules 1504 includes an integrated circuit, or chip 1502, and each chip 1502 contains a transceiver 1102. The module 1504 is located on the memory card 1506. The signals from the two-on-one link signal line signal line 922 are split on the card 1506. Therefore, a single pin is required into both chips 1502 for providing communication between the transceivers 1102 and the two-on-one link signal line signal line 922.

Figure 21:
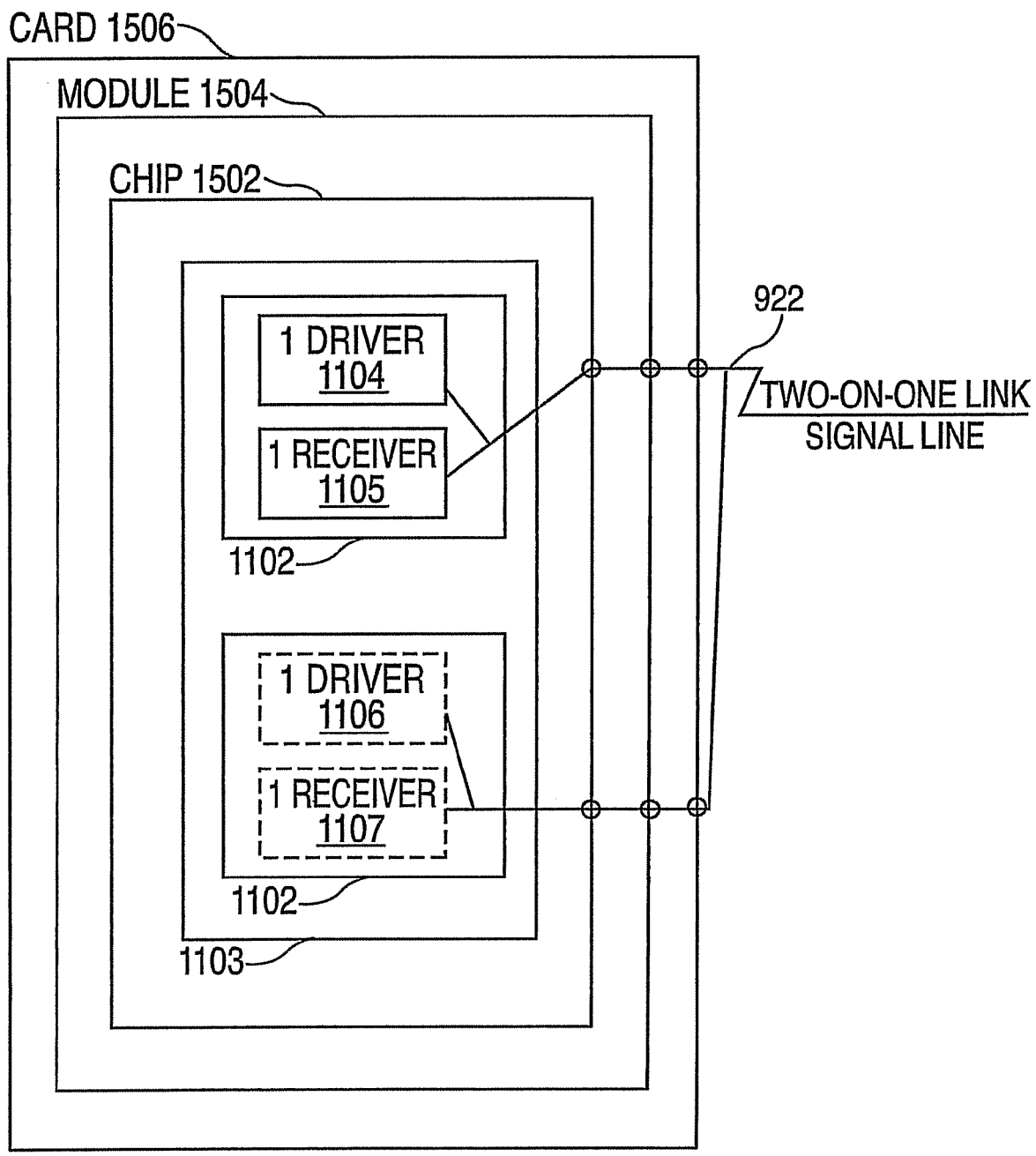
FIG. 21 depicts a memory card with a two-on-one link that may be implemented by exemplary embodiments.

FIG. 21 depicts a memory card 1506 with two-on-one link transceiver 1103 in communication with two connection points on a two-on-one link signal line signal line 922 that may be implemented by exemplary embodiments. As depicted in FIG. 21, the single transceivers 1102 within the two-on-one link transceiver 1103 are located on the same integrated circuit, or chip 1502. The chip 1502 is located on a single module 1504, and the module 1504 is located on the memory card 1506. The signals from the two-on-one link signal line signal line 922 are split before they are input to the card 1506. Therefore, two pins are required on the chip 1502 for providing communication between the transceivers 1102 and the two-on-one link signal line signal line 922.

The chip 1502 described above in reference to FIGS. 15-21 may be located on a memory controller 902 and/or a memory subsystem 904.

Figure 22:
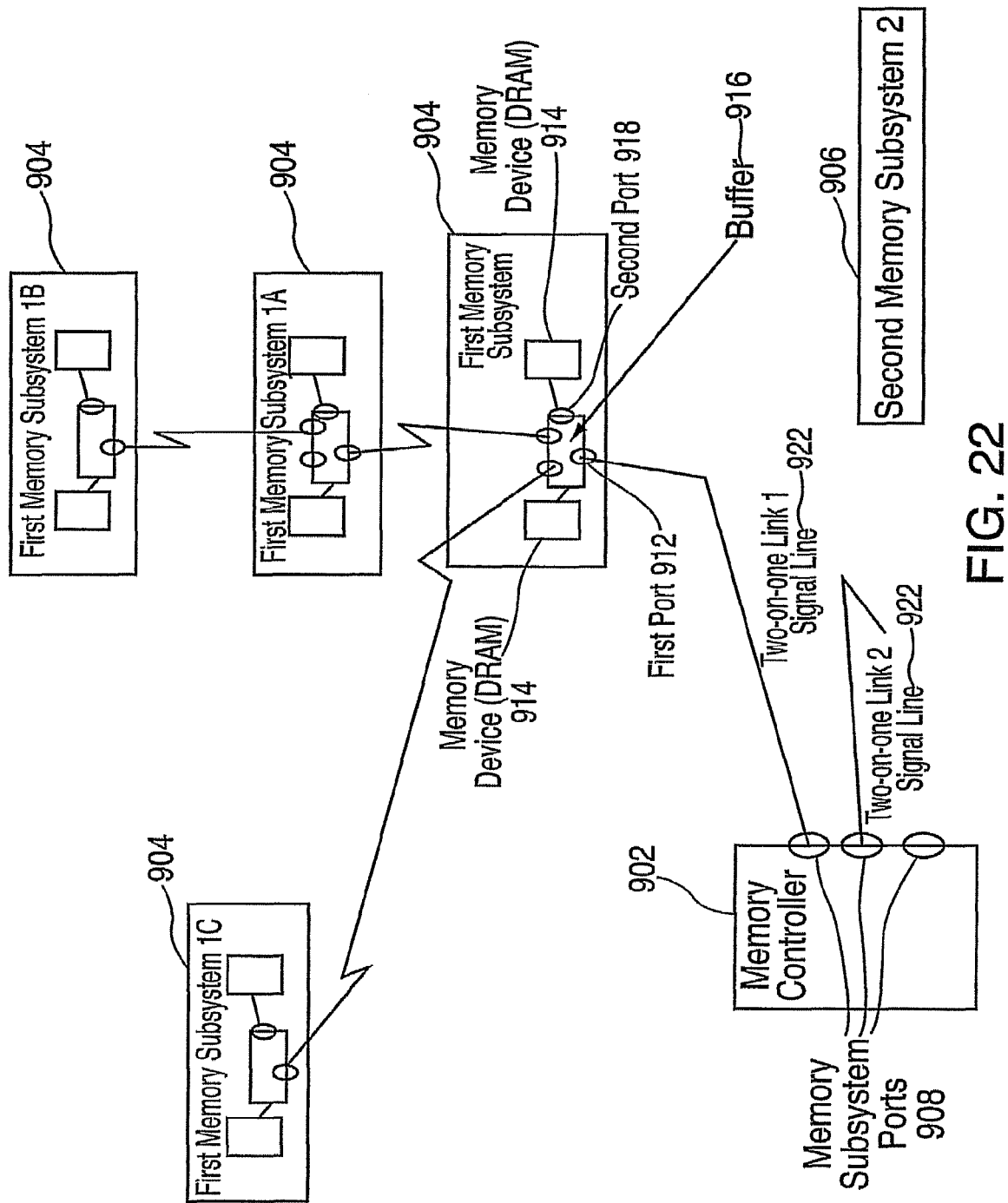
FIG. 22 depicts a memory system with a two-on-one link that may be implemented by exemplary embodiments to implement a daisy-chained architecture and to drive data signals to two or more memory subsystems.

Other memory structures may also be implemented by exemplary embodiments that include a two-on-one link signal line signal line 922. See for example, FIG. 22 which depicts a memory system with a two-on-one link signal line signal line 922 that may be implemented by exemplary embodiments to implement a daisy-chained architecture and to drive data signals to two or more memory subsystems 904. The memory system depicted in FIG. 22 includes a memory controller 902, a plurality of first memory subsystems 904 (1, 1A, 1B, and 1C), a second memory subsystem 906, and a plurality of two-on-one links signal line signal line 922. The memory controller 902 includes an interface with a plurality of memory subsystem ports 908. Each of the first memory subsystems 904 include a buffer device 916, and a plurality of memory devices 914. Data is transferred between at least one of the memory devices 914 and the memory controller 902 via the buffer device 916. As depicted in FIG. 22, the buffer device 916 in the first memory subsystem 904 denoted "1" may be utilized to drive the signals to/from the memory controller to two or more memory subsystems 904 (in this example, 1C and 1A). Further, one of these memory subsystems 904 may be part of a cascaded interconnection between memory subsystems 904 (e.g., 1, 1A and 1B) via interconnection 2201, 2202, 2203. In one embodiment, the interconnections 2201, 2202, 2203 comprises two-on-one links.

Figure 23:
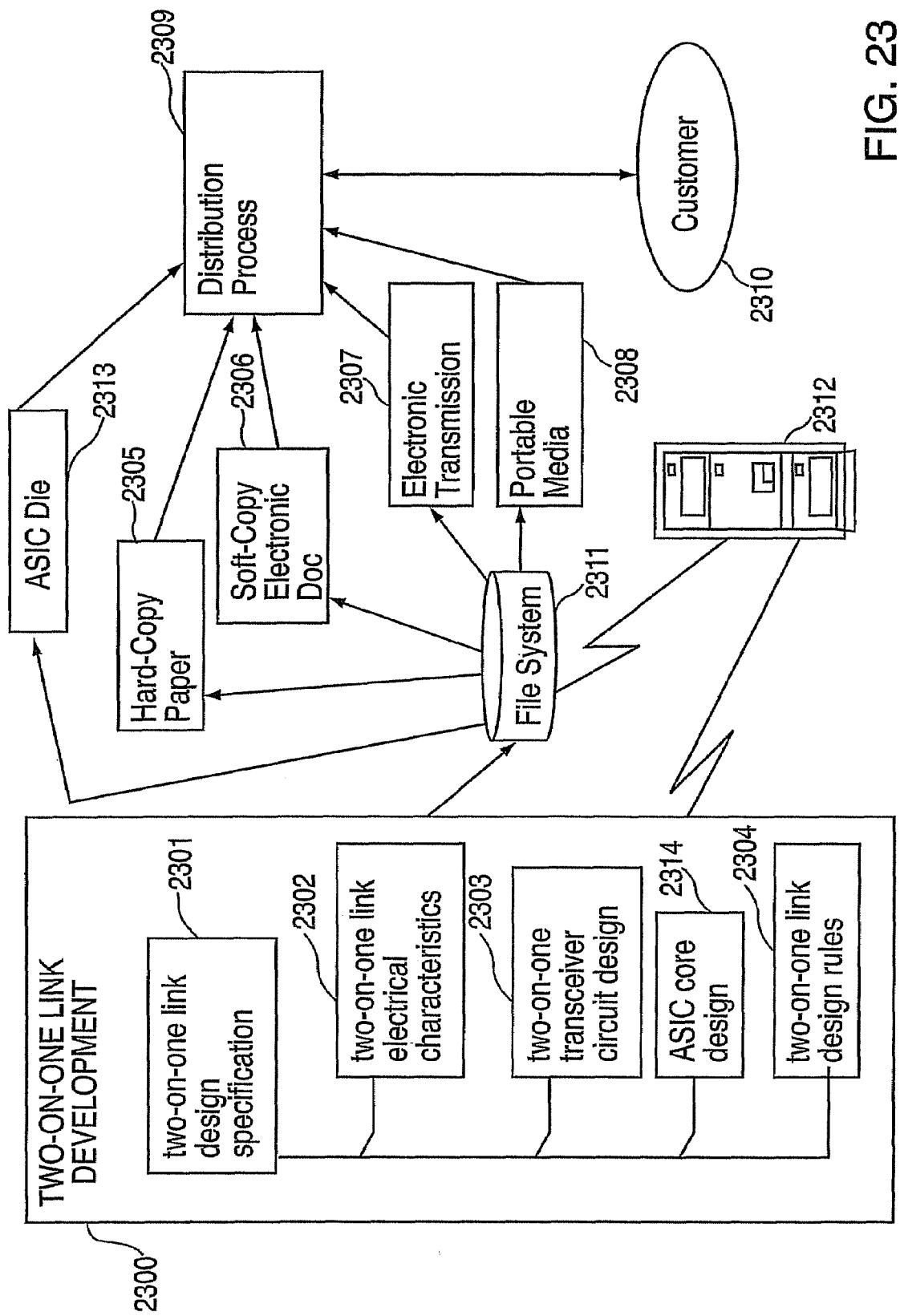
FIG. 23 depicts an example service for deployment and distribution and sales of the present invention.

Referring to FIG. 23, an example service for deployment, distribution and sales of the present invention is shown. A two-on-one technology development group, develops 2300 the technology. In one embodiment, the development produces a design of a two-on-one specification 2301, specifying characteristics of a preferred embodiment. Other embodiments would create any one of two-on-one electrical characteristic 2302 information, transceiver circuit designs 2303 or link design rules 2304, ASIC Core design information 2314 or other design information known in the art.

Typically all information is created and stored by computer systems 2312 in one or more file systems 2311 having version controls and feature identifiers as are well known in the art.

The service may provide the two-on-one information to customers 2310 by way of a variety of media including paper hard copy documents 2305, soft-copy electronic documents 2306, electronic transmission 2307 of various types of data, and portable media 2308 such as CD, DVD, Tape and the like. The distribution and marketing of the media is controlled by the services distribution process 2309. The Distribution process 2309 includes methods for licensing and billing customers for products provided as is well known in the art.

In one embodiment, the service develops an ASIC Die containing two-on-one transceivers of the present invention for distribution to customers. The ASIC may include any one of a buffer function or a memory controller function.

While this invention has been described in conjunction with what is presently considered the most practical embodiments, the invention is not limited to the disclosed embodiments. In the contrary, the embodiments disclosed cover various modifications that are within the scope of the invention as set forth in the following claims.

While a preferred embodiment of the invention has been illustrated and described herein, it is to be understood that the invention is not limited to the precise construction herein disclosed, and the right is "reserved" to all changes and modifications coming within the scope of the invention as defined in the appended claims.

The invention claimed is:

1. A memory system comprising:
a first memory subsystem comprising:
a buffer device having a first port, a second port, and a third port;
one or more memory devices coupled to the buffer device via the second port;
a first two-on-one link for coupling to a memory controller for providing communication between the buffer device and the memory controller, the first two-on- one link coupled to the first port of the buffer device, the first memory subsystem configured to transfer data between at least one memory device of the one or more memory devices and the memory controller via the buffer device and the first two-on-one link, wherein the first two-on-one link comprises up to two transceivers connected to a single link, wherein at least one of the up to two transceivers consists of two or more transmitters on a single chip die connected to a single chip die output pad for transmitting signals via the single chip die output pad over the single;
a second buffer device having a first port and a second port;
a second two-on-one link having a first connection to the third port of the buffer device and a second connection to the first port of the second buffer device; and
one or more second memory devices connected to the second port of the second buffer device, wherein the memory subsystem is further configured to transfer data between at least one memory device of the one or more second memory devices and the memory controller via a path comprising the buffer device, the first two-on-one link, the second buffer device and the second two-on-one link.

2. The memory system according to claim 1, wherein said first memory subsystem is one of a plurality of memory subsystems of said memory system and said first memory subsystem is disposed on a substrate separate from any other one of said plurality of memory subsystems.

3. The memory system of claim 1, wherein the first memory subsystem further includes a plurality of channels and a plurality of memory device select lines connected between the memory devices and the second port.

4. The memory system of claim 1 further comprising the memory controller, wherein the memory controller includes an interface, said interface including one or more memory subsystem ports for connecting to respective memory subsystems via a plurality of two-on-one links connected to respective memory subsystem ports of the plurality of memory subsystem ports, the plurality of two-on-one links including the first two-on-one link connecting the first port of the buffer device to a first memory subsystem port of the plurality of memory subsystem ports.

5. The memory system according to claim 4 further including a third two-on-one link having a connection to the memory controller and a fourth two-on-one link having a connection to the memory controller, wherein each of the third and the fourth two-on-one links comprise up to two transceivers connected to a single link, wherein at least one of the up to two transceivers consists of any one of two or more transmitters on a single chip die connected to a single chip die output pad for transmitting signals via the single chip die output pad over the single link or two or more receivers on the single chip die connected to a single chip die input pad for receiving signals via the single chip die input pad from the single link.

6. The memory subsystem of claim 4, wherein the memory system further comprises:
a third buffer device having a first port and a second port;
one or more third memory devices coupled to the third buffer device via the second port on the third buffer device; and
a third two-on-one link coupled to the first port of the third buffer device and to a second port on the memory controller for providing communication between the second buffer device and the memory controller, wherein the third two-on-one link comprises up to two transceivers connected to a single link, wherein at least one of the up to two transceivers consists of any one of two or more transmitters on a single chip die connected to a single chip die output pad for transmitting signals via the single chip die output pad over the single link or two or more receivers on the single chip die connected to a single chip die input pad for receiving signals via the single chip die input pad from the single link, wherein data is transferred between at least one memory device of the one or more third memory devices and the memory controller via the third buffer device and the third two-on-one link.

7. The memory system according to claim 1, wherein the second buffer device further includes a third port, the memory system further comprising:
a third buffer device having a first port and a second port;
a third two-on-one link having a first connection to the third port on the second buffer device and a second connection to the first port of the third buffer device; and
one or more third memory devices connected to the second port of the third buffer device, wherein the memory system is configured to transfer data between at least one memory device of the one or more of third memory devices and the memory controller via a path comprising the buffer device, the first two-on-one link, the second buffer device, the second two-on-one link, the third buffer device and the third two-on-one link, wherein the third two-on-one link comprises up to two transceivers connected to a single link, wherein at least one of the up to two transceivers consists of any one of two or more transmitters on a single chip die connected to a single chip die output pad for transmitting signals via the single chip die output pad over the single link or two or more receivers on the single chip die connected to a single chip die input pad for receiving signals via the single chip die input pad from the single link.

8. The memory system according to claim 1, wherein the first two-on-one link further comprises a first link portion and a second link portion, said first and second link portions interconnected via a corresponding connector.

9. A memory subsystem comprising:
one or more repeater devices;
one or more two-on-one links, each two-on-one link having a first connection for connecting to a memory controller and a second connection connected to a respective repeater device of the one or more repeater devices, wherein the memory controller is connected to each respective repeater device via a respective two-on-one link;
a plurality of repeater links, each repeater link having a first connection for connecting to a respective buffer device of a plurality of buffer devices and a second connection to the respective repeater device, wherein the memory subsystem is configured to transfer data between at least one memory device and the memory controller via a path comprising a buffer device, a repeater link, the respective repeater and the two-on-one link, wherein the two-on-one link comprises up to two transceivers connected to a single link, wherein at least one of the up to two transceivers consists of two or more transmitters on a single chip die connected to a single chip die output pad for transmitting signals via the single chip die output pad over the single;
a first plurality of buffer devices, each buffer device of the first plurality of buffer devices having an interface connected to a respective one or more memory devices, each buffer device of the first plurality of buffer devices having a second interface connected to said respective repeater device via said respective repeater link; and
a second plurality of buffer devices, each buffer device of the second plurality of buffer devices having an interface connected to a respective one or more second memory devices, and
wherein each of said repeater links consist of a corresponding two-on-one link wherein each two-on-one link comprises up to two transceivers connected to a single link, wherein at least one of the up to two transceivers consists of any one of two or more transmitters on a single chip die connected to a single chip die output pad for transmitting signals via the single chip die output pad over the single link or two or more receivers on the single chip die connected to a single chip die input pad for receiving signals via the single chip die input pad from the single link.

10. The memory subsystem of claim 9 further comprising the memory controller connected to each respective repeater device via a respective two-on-one link.

11. The memory subsystem according to claim 10, further comprising:
a second repeater device of the one or more repeater devices;
a second two-on-one link of the one or more two-on-one links having a first connection to the memory controller and a second connection to the second repeater device; and
a second plurality of repeater links, each repeater link in the second plurality of repeater links having a first connection to a respective buffer device of the second plurality of buffer devices and a second connection to the second repeater device.

12. The memory subsystem according to claim 11, wherein each of said repeater links consist of a corresponding two-on-one link wherein each two-on-one link comprises up to two transceivers connected to a single link, wherein at least one of the up to two transceivers consists of any one of two or more transmitters on a single chip die connected to a single chip die output pad for transmitting signals via the single chip die output pad over the single link or two or more receivers on the single chip die connected to a single chip die input pad for receiving signals via the single chip die input pad from the single link.

13. A computer memory subsystem method comprising:
a memory controller receiving data from a buffer device at a memory subsystem port on a memory controller having a plurality of memory subsystem ports, the data received via a two-on-one link coupled to the buffer device, the buffer device having a first port coupled to one or more memory devices and a second port coupled to the two-on-one link wherein the data received at the memory controller is transferred from at least one of the memory devices to the memory controller via the buffer device and the two-on-one link, wherein the two-on-one link comprises up to two transceivers connected to a single link, wherein at least one of the up to two transceivers consists of two or more transmitters on a single chip die connected to a single chip die output pad for transmitting signals via the single chip die output pad over the single link;
transmitting data from the memory subsystem port on the memory controller to the first port on the buffer device via the two-on-one link;
the at least one of the transceivers performs a function consisting of any one of receiving data by way of two receivers or transmitting data by way of a selected one of said two transmitters, and wherein the buffer device further includes a third port in communication with a second buffer device via a second two-on-one link, the second buffer device having a first port coupled to one or more second memory devices and a second port coupled to the second two-on-one link comprising the further step of transferring data between one or more of the second memory devices and the memory controller via the second two-on-one link, the buffer device and the two-on-one link wherein the second two-on-one link comprises up to two transceivers connected to a single link, wherein at least one of the up to two transceivers consists of any one of two or more transmitters on a single chip die connected to a single chip die output pad for transmitting signals via the single chip die output pad over the single link or two or more receivers on the single chip die connected to a single chip die input pad for receiving signals via the single chip die input pad from the single link.

14. The memory subsystem method of claim 13 comprising the further step of:
the memory controller receiving data from a third buffer device via a third two-on-one link and a second memory subsystem port on the memory controller; and
the memory controller transmitting data to the third buffer device via the third two-on-one link and the second memory subsystem port on the memory controller, wherein the third two-on-one link comprises up to two transceivers connected to a single link, wherein at least one of the up to two transceivers consists of any one of two or more transmitters on a single chip die connected to a single chip die output pad for transmitting signals via the single chip die output pad over the single link or two or more receivers on the single chip die connected to a single chip die input pad for receiving signals via the single chip die input pad from the single link.

15. The memory subsystem method of claim 13 wherein the second buffer device further includes a third port in communication with a third buffer device via a third two-on-one link, the third buffer device having a first port coupled to one or more third memory devices and a second port coupled to the third two-on-one link comprising the further step of transferring data between one or more of the third memory devices and the memory controller via the third two-on-one link, the second buffer device, the second two-on-one link, the buffer device and the two-on-one link wherein the third two-on-one link comprises up to two transceivers connected to a single link, wherein at least one of the up to two transceivers consists of any one of two or more transmitters on a single chip die connected to a single chip die output pad for transmitting signals via the single chip die output pad over the single link or two or more receivers on the single chip die connected to a single chip die input pad for receiving signals via the single chip die input pad from the single link.

16. The memory subsystem method according to claim 13, wherein each two-on-one link further comprises a first link portion and a second link portion, said first and second link portions interconnected via a corresponding connector.

17. A computer memory subsystem method comprising:
a repeater device comprising a two-on-one link and a plurality of repeater links, the repeater device receiving first data from one of said repeater links and transmitting the first data to said two-on-one link;
the repeater device receiving second data from said two-on-one link and transmitting the second data to one of said repeater links, wherein the two-on-one link comprises up to two transceivers connected to a single link, wherein at least one of the up to two transceivers consists of two or more transmitters on a single chip die connected to a single chip die output pad for transmitting signals via the single chip die output pad over the single link, wherein the at least one of the transceivers performs a function consisting of transmitting data by way of a selected one of said two transmitters;
a first plurality of buffer devices, each buffer device of the first plurality of buffer devices having an interface connected to a respective one or more memory devices, each buffer device of the first plurality of buffer devices having a second interface connected to said respective repeater device via said respective repeater link, the repeater device receiving the first data from the first plurality of buffer devices via one of the repeater links;

a second plurality of buffer devices, each buffer device of the second plurality of buffer devices having an interface connected to a respective one or more second memory devices, the repeater device receiving the first data from the first plurality of buffer devices via one of the repeater links; and wherein each of the repeater links consist of a corresponding two-on-one link wherein each two-on-one link of the repeater links comprises up to two transceivers connected to a single link, wherein at least one of the up to two transceivers consists of any one of two or more transmitters on a single chip die connected to a single chip die output pad for transmitting signals via the single chip die output pad over the single link or two or more receivers on the single chip die connected to a single chip die input pad for receiving signals via the single chip die input pad from the single link.

18. The method of claim 17 wherein the repeater device is in communication with the first and second plurality of buffer devices via the plurality of repeater links comprising:

receiving said first data from the memory device at one of the first plurality of buffer devices;

transmitting said first data from said one of the first plurality of buffer devices to said one of said repeater links;

a memory controller receiving said first data from said two-on-one link;

transmitting said second data from said memory controller to said two-on-one link;

one of said second plurality of buffer devices receiving said second data from said one of said repeater links; and one of said second plurality of buffer devices transmitting said second data to one of said second memory devices.

19. The method of claim 18 further comprising:

a second repeater device comprising a second two-on-one link connected with the memory controller and a plurality of second repeater links, the repeater device receiving third data from one of said repeater links and transmitting the third data to said second two-on-one link;

the repeater device receiving fourth data from a second two-on-one link and transmitting the fourth data to one of said second repeater links wherein each two-on- one link comprises up to two transceivers connected to a single link, wherein at least one of the up to two transceivers consists of any one of two or more transmitters on a single chip die connected to a single chip die output pad for transmitting signals via the single chip die output pad over the single link or two or more receivers on the single chip die connected to a single chip die input pad for receiving signals via the single chip die input pad from the single link, wherein the at least one of the transceivers performs a function consisting of any one of receiving data by way of the two receivers or transmitting data by way of a selected one of said two transmitters.

20. The method according to claim 17, wherein each two-on-one link further comprises a first link portion and a second link portion, said first and second link portions interconnected via a corresponding connector.

21. A memory system comprising:

a controller device;

a first buffer device having a first interface, a second interface, and a third interface;

a second buffer device having a first interface and a second interface;

a first two-on-one link having a first connection to the controller device and a second connection to the first interface of the first buffer device;

a first plurality of memory devices connected to the second interface of the first buffer device;

a second two-on-one link having a first connection to the controller device and a second connection to the first interface of the second buffer device;

a second plurality of memory devices connected to the second interface of the second buffer device wherein each two-on-one link comprises up to two transceivers connected to a single link, wherein at least one of the up to two transceivers consists of two or more transmitters on a single chip die connected to a single chip die output pad for transmitting signals via the single chip die output pad over the single link;

a third buffer device having a first interface and a second interface;

a third two-on-one link having a first connection to the third interface and a second connection to the first interface of the third buffer device; and a third plurality of memory devices connected to the second interface of the third buffer device.

* * * * *